United States Patent
Kinjo

[11] Patent Number: 5,978,100
[45] Date of Patent: Nov. 2, 1999

[54] METHOD OF DETERMINING A PRINCIPAL PORTION OF AN IMAGE AND METHOD OF DETERMINING A COPYING CONDITION

[75] Inventor: Naoto Kinjo, Kanagawa, Japan

[73] Assignee: Fuji Photo Film Co., Ltd., Kanagawa, Japan

[21] Appl. No.: 08/748,832

[22] Filed: Nov. 14, 1996

[30] Foreign Application Priority Data

Nov. 14, 1995 [JP] Japan ................................ 7-295209

[51] Int. Cl.$^6$ ........................... H04N 1/387; H04N 1/46; G06K 9/46
[52] U.S. Cl. ........................ 358/453; 358/298; 358/538; 382/165; 382/190; 382/118
[58] Field of Search .................. 358/296, 298, 358/448, 452, 453, 530, 537, 538; 382/162, 165, 181, 190, 118

[56] References Cited

U.S. PATENT DOCUMENTS

| | | | |
|---|---|---|---|
| 5,463,470 | 10/1995 | Terashita et al. | 358/298 |
| 5,497,431 | 3/1996 | Nakamura | 382/162 |
| 5,539,523 | 7/1996 | Nakai et al. | 358/296 |
| 5,689,575 | 11/1997 | Sako et al. | 382/118 |

FOREIGN PATENT DOCUMENTS

| | | | |
|---|---|---|---|
| 52-156624 | 12/1977 | Japan | G03B 27/72 |
| 52-156625 | 12/1977 | Japan | G03B 27/72 |
| 53-12330 | 2/1978 | Japan | G03B 27/72 |
| 53-145620 | 12/1978 | Japan | G03B 27/76 |
| 53-145621 | 12/1978 | Japan | G03B 27/76 |
| 53-145622 | 12/1978 | Japan | G03B 27/76 |
| 4-346332 | 12/1992 | Japan | G03B 27/73 |
| 4-346333 | 12/1992 | Japan | G03B 27/73 |
| 6-160993 | 6/1994 | Japan | G03B 27/73 |
| 6-265850 | 9/1994 | Japan | G02F 1/333 |
| 6-266598 | 9/1994 | Japan | G06F 12/00 |

*Primary Examiner*—Eric Frahm
*Attorney, Agent, or Firm*—Sughrue, Mion, Zinn, Macpeak & Seas, PLLC

[57] ABSTRACT

Extracting, from an identical original image, regions estimated to correspond to a principal portion thereof, respectively, by means of a plurality of mutually different extracting methods for extracting from an original image a region estimated to correspond to a principal portion thereof, and evaluating the extracting methods by comparing with respect to a plurality of original images, on the one hand, the regions estimated to correspond to the principal portion and extracted respectively from the identical original image by the extracting methods and, on the other hand, a region corresponding to the principal portion of the identical original image, or a region having a high probability of being a region corresponding to the principal portion of the identical original image and determined on the basis of the regions estimated to correspond to the principal portion and extracted respectively by the extracting methods; setting in advance a weight with respect to each of the extracting methods in correspondence with a result of evaluation; extracting regions estimated to correspond to a principal portion, respectively, from an original image from which the principal portion is to be extracted, by the extracting methods; weighting each of the extracted regions by the weight set for each of the extracting methods; and determining a region having a high probability of being a region corresponding to the principal portion of the original image, based on a result of the weighting. A region corresponding to a principal portion of the original image is determined appropriately with a high probability.

32 Claims, 17 Drawing Sheets

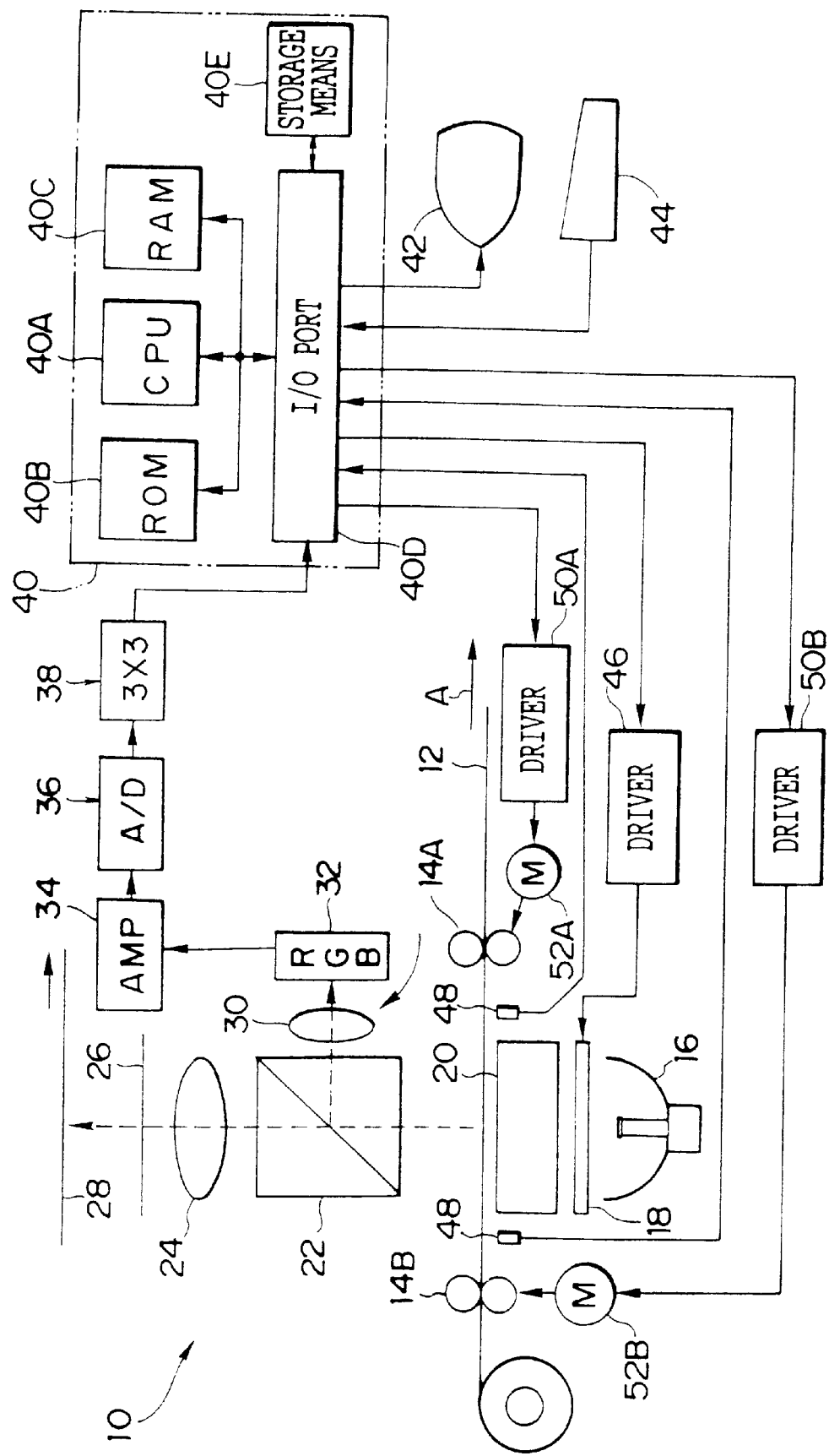

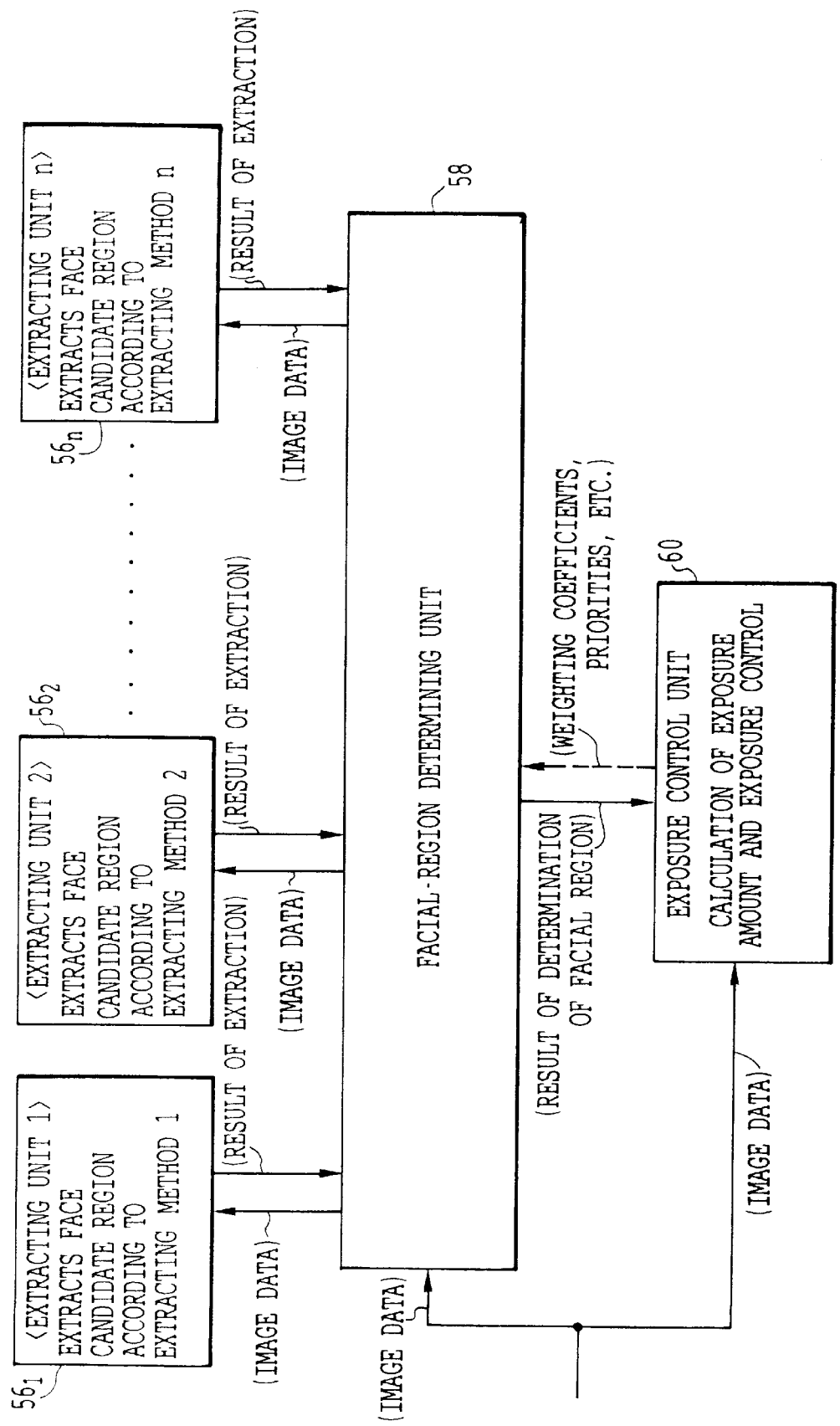

F I G. 5
(B) RESULTS OF EXTRACTION BY EXTRACTING UNITS
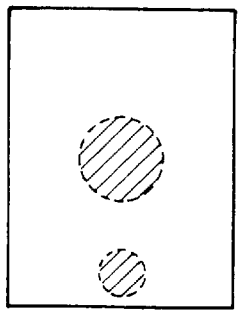
(EXTRACTING UNIT 1)
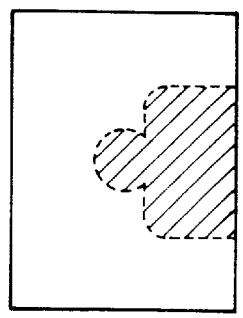
(EXTRACTING UNIT 2)
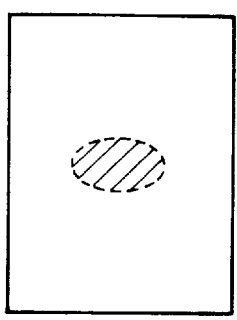
(EXTRACTING UNIT n)
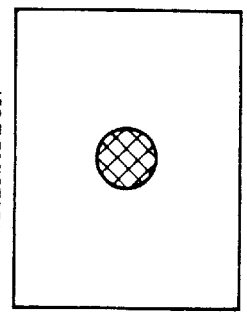
(C) RESULT OF FACIAL-REGION DETERMINATION
▨ : REGION DETERMINED TO BE FACIAL REGION
▨ : FACE CANDIDATE REGION
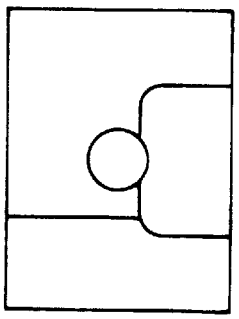
(A) ORIGINAL IMAGE

FIG. 6B

```
         (B)
          ↓
┌─────────────────────────────────────────┐
│ WITH RESPECT TO PREDETERMINED IMAGE,    │──118
│ FETCH INFORMATION REPRESENTING FACE     │
│ CANDIDATE REGION EXTRACTED BY EACH      │
│ EXTRACTING UNIT, AND INFORMATION        │
│ REPRESENTING A FINALLY DETERMINED       │
│ FACIAL REGION                           │
└─────────────────────────────────────────┘
          ↓
┌─────────────────────────────────────────┐
│ CALCULATE AND STORE THE DEGREE OF       │──120
│ COINCIDENCE BETWEEN FACE CANDIDATE      │
│ REGION EXTRACTED BY EACH EXTRACTING     │
│ UNIT AND THE FINALLY DETERMINED         │
│ FACIAL REGION                           │
└─────────────────────────────────────────┘
          ↓
      ╱ IS PROCESSING ╲ ──122
     ╱ COMPLETED FOR ALL ╲        N
    ╱ IMAGES INFORMATION  ╲───────→
     ╲ ON WHICH HAS       ╱
      ╲ BEEN STORED?     ╱
          ↓ Y
┌─────────────────────────────────────────┐
│ EVALUATE FACIAL-REGION EXTRACTING       │──124
│ PERFORMANCE ACCORDING TO EACH           │
│ EXTRACTING METHOD, ON THE BASIS OF      │
│ THE CALCULATED DEGREE OF COINCIDENCE    │
└─────────────────────────────────────────┘
          ↓
┌─────────────────────────────────────────┐
│ UPDATE WEIGHTING COEFFICIENTS FOR EACH  │──126
│ EXTRACTING METHOD IN ACCORDANCE WITH    │
│ THE RESULT OF EVALUATION                │
└─────────────────────────────────────────┘
          ↓
┌─────────────────────────────────────────┐
│ CORRECT PRIORITIES IMPARTED TO THE      │──127
│ EXTRACTING METHODS IN ACCORDANCE WITH   │
│ THE RESULT OF EVALUATION                │
└─────────────────────────────────────────┘
          ↓
┌─────────────────────────────────────────┐
│ DELETE INFORMATION STORED FOR           │──128
│ EVALUATION OF EACH EXTRACTING METHOD    │
└─────────────────────────────────────────┘
          ↓
        (A)→
         ( END )
```

F I G. 7A
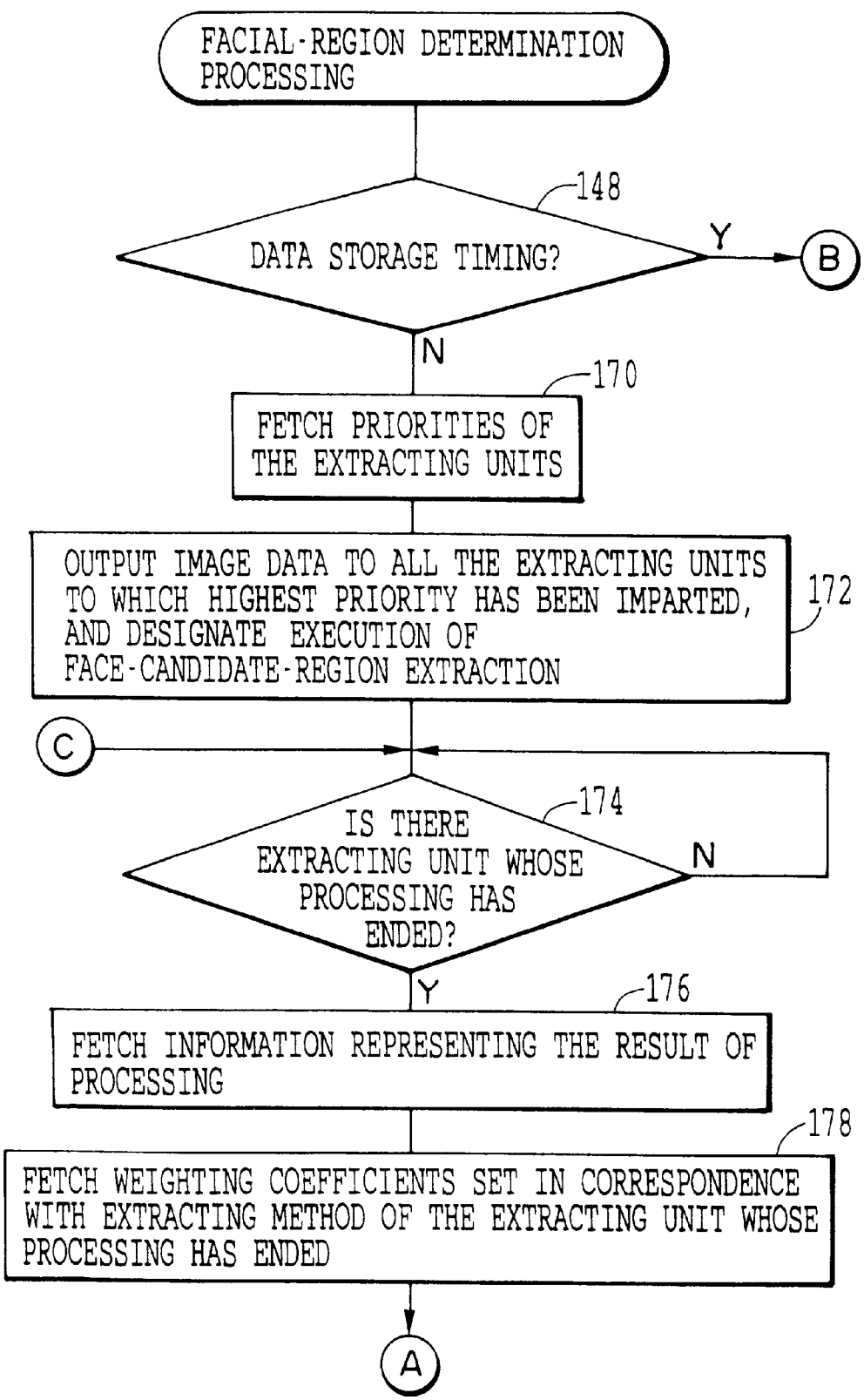

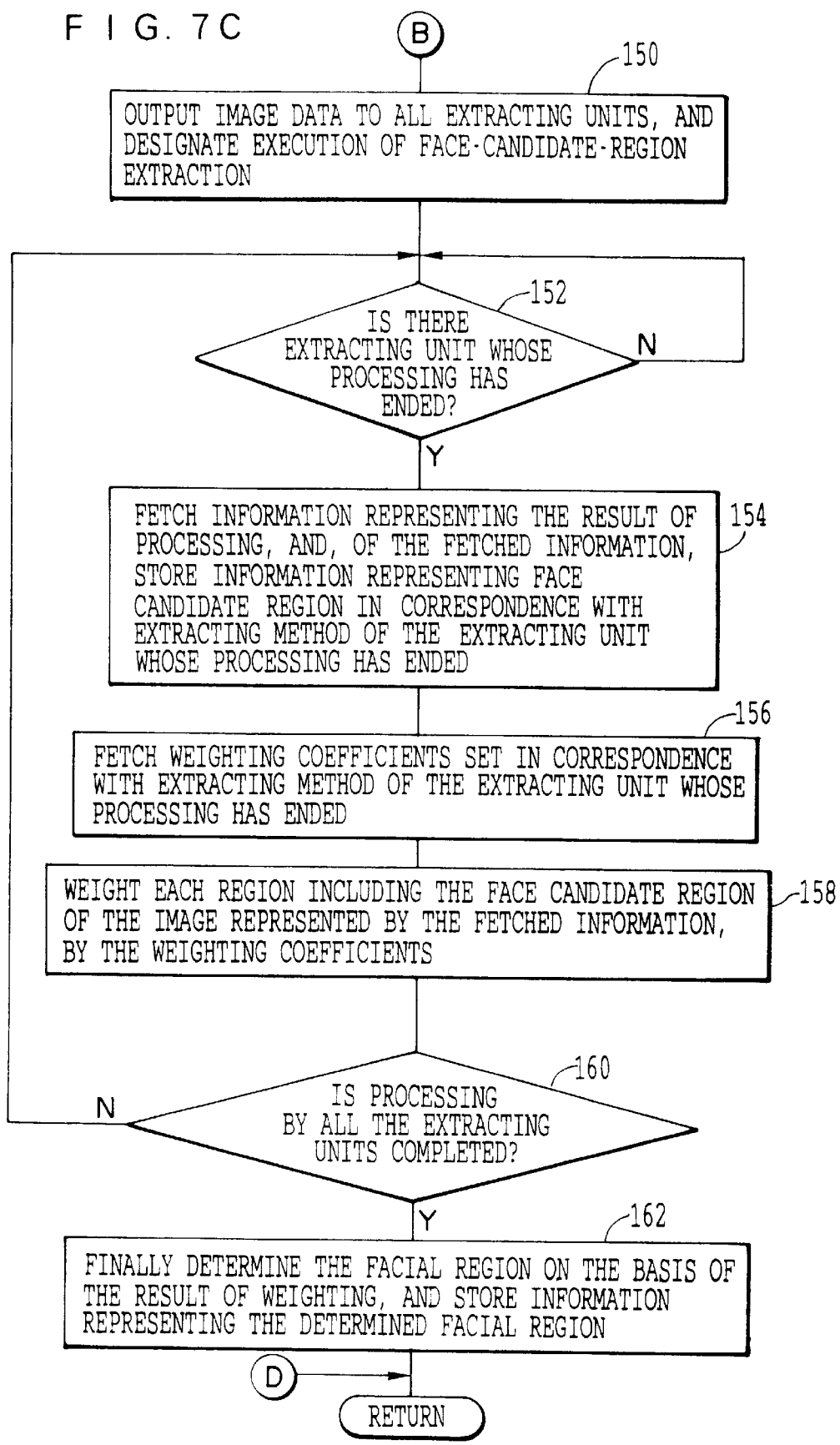

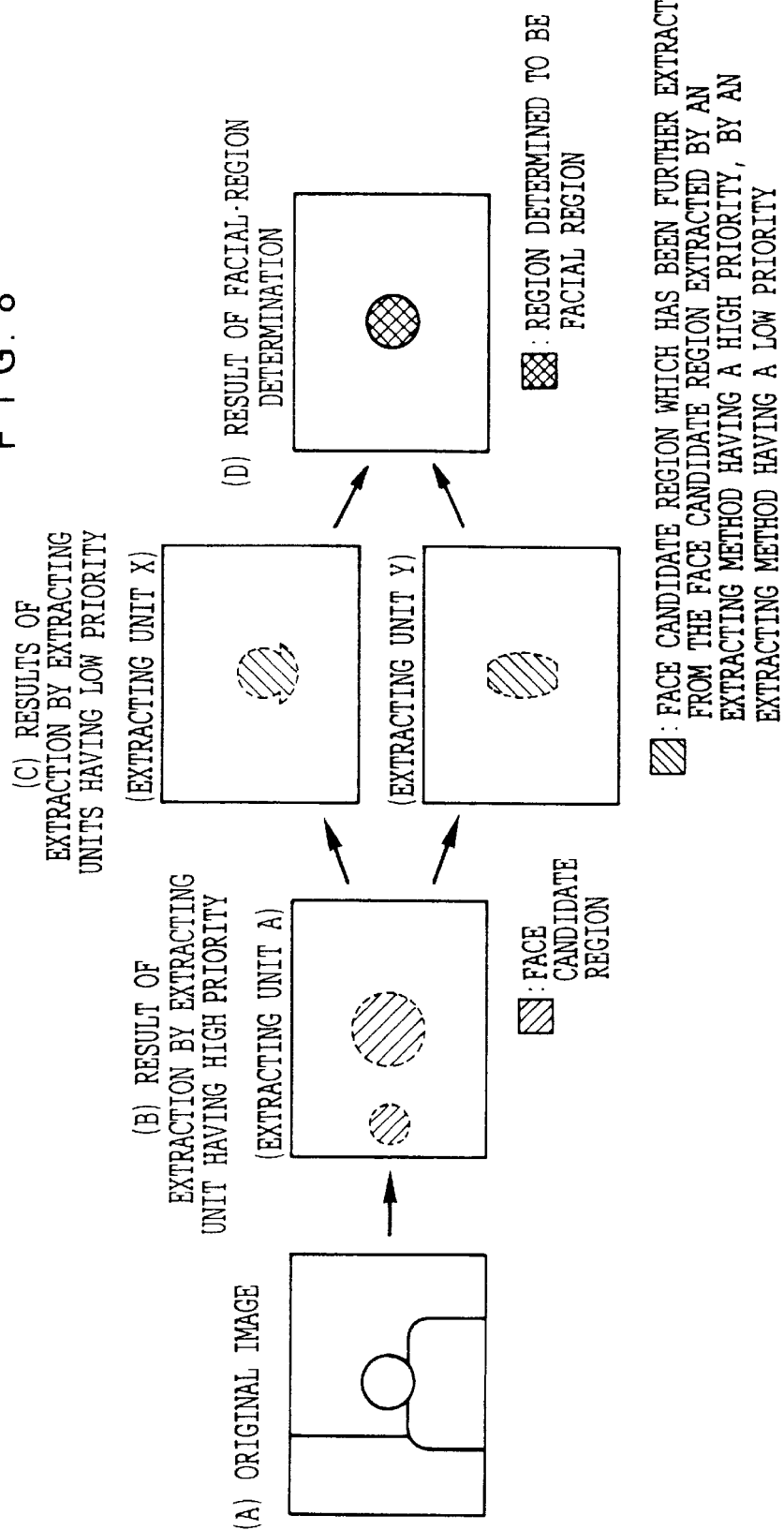

METHOD OF DETERMINING A PRINCIPAL PORTION OF AN IMAGE AND METHOD OF DETERMINING A COPYING CONDITION

BACKGROUND OF THE INVENTION

1. Field of the Invention

The present invention relates to a method of determining a principal portion of an image and a method of determining a copying condition, and more particularly to a method of determining a principal portion for determining a region having a high probability of being a region corresponding to a principal portion of an image, as well as a method of determining a copying condition in such a manner as to allow a principal portion of an image to be copied appropriately.

2. Description of the Related Art

In the appreciation of photographs, viewers' attention is mostly focused on a particular portion (hereafter referred to as a principal portion) of the image just as the face of a human figure attracts the greatest attention in the case of portraits, for example. Therefore, when an original image recorded on a recording material such as a film is copied onto a copying material such as a photographic printing paper, it is necessary to determine a copying condition in such a manner that the principal portion, such as the face of a human figure, is printed appropriately.

For this reason, in Japanese Patent Application Laid-Open No. 346332/1992, the applicant proposed a technique wherein a color original image is divided into a multiplicity of pixels, and is spectrally separated into three colors and photometrically measured for each pixel; a histogram on hue values (and saturation values) is determined on the basis of data obtained by the photometry; the determined histogram is divided into ridges; a determination is made as to to which of the divided ridges each pixel belongs, and each pixel is classified into groups corresponding to the divided ridges; the color original image is divided into a plurality of regions for each group; a region corresponding to the face of a human figure serving as the principal portion among the plurality of regions is estimated; and the exposure amount is determined on the basis of the photometric data on the estimated region.

With the above-described technique, however, in a case where a non-human figure region of flesh color, such as the ground or a trunk of a tree, which is present in the original image, is located adjacent to the region corresponding to the face of the human figure, it is difficult to separate the region corresponding to the face of the human figure and the non-human figure region.

In addition, in Japanese Patent Application Laid-Open No. 160993/1994, a proposal has been made in which, in the above-described technique, to improve the probability of extracting a region corresponding to the face of a human figure, a region abutting against an outer periphery of the image is determined to be a background region and is eliminated, or an extracted region is represented as a diagram, and a determination is made as to whether or not the extracted region is a region corresponding to the face of a human figure, on the basis of the shape of a neighboring region located in the vicinity of the extracted region or the shape of the extracted region.

With the above-described technique, however, a skin-colored region, such as the ground or a trunk of a tree, is present in the original image, in a case where the hue and the saturation of the skin-colored region are similar to the hue and the saturation of the region corresponding to the face of the human figure in the original image, there is a possibility that this skin-colored region is erroneously determined to be a region corresponding to the face of a human figure. In addition, if this skin-colored region is adjacent to the region corresponding to the face of the human figure, the skin-colored region and the region corresponding to the face of the human figure cannot be separated from each other, so that the region corresponding to the face of the human figure cannot be extracted appropriately.

The problem encountered in the above-described methods is attributable to the fact that the contents of images photographic processing of which is requested are indefinite, and that images of various contents are brought in. Namely, the present situation is such that it is difficult to reliably extract a region corresponding to the principal portion of an image in each of the above-described various methods of extracting a principal portion or the methods of extracting a principal portion proposed by the applicant in Japanese Patent Application Laid-Open Nos. 265850/1994 and 266598/1994. In each method, images whose principal portions are possibly extracted erroneously are present. For instance, a non-principal portion is erroneously extracted as a principal portion, or a region in which a non-principal portion and a principal portion are present in a mixed form is erroneously extracted as the principal portion. Conversely, a principal portion is determined to be the region corresponding to a non-principal portion, and is not extracted.

Accordingly, even if an attempt is made to automatically determine the copying condition (exposure amount) by extracting the principal portions according to any one of the above-described methods, the incidence in which an appropriate copying condition cannot be obtained due to the erroneous extraction of the principal portion occurs with a probability exceeding a predetermined value. Hence, it has been difficult to improve the probability of obtaining an appropriate exposure amount.

SUMMARY OF THE INVENTION

In view of the above-described circumstances, it is an object of the present invention to provide a method of determining a principal portion of an image which makes it possible to appropriately determine a region corresponding to the principal portion of an original image with a high probability.

Another object of the present invention to provide a method of determining a copying condition which makes it possible to obtain with a high probability a copying condition which permits a region corresponding to the principal portion of an original image to be copied appropriately.

The present inventor made a comparison and a study of images having the possibility of erroneously extracting principal portions according to various methods of extracting a principal portion which have hitherto been proposed. As a result, it became clear that images having the possibility of their principal portions being erroneously extracted are not necessarily the same in the respective extracting methods. In view of this fact, the present inventor have devised the present invention after finding out that principal portions of images, though erroneously extracted in one method, are frequently extracted properly in another method, so that if various extracting methods are used jointly, and drawbacks of some extracting methods are compensated for by other extracting methods, there is a possibility of improving the probability of being able to properly determine principal portions of images.

Accordingly, in accordance with a first aspect of the present invention, there is provided a method of determining a principal portion of an image, comprising the steps of: extracting, from an identical original image, regions estimated to correspond to a principal portion thereof, respectively, by means of a plurality of mutually different extracting methods for extracting from an original image a region estimated to correspond to a principal portion thereof, and evaluating the extracting methods by comparing with respect to a plurality of original images, on the one hand, the regions estimated to correspond to the principal portion and extracted respectively from the identical original image by the extracting methods and, on the other hand, a region corresponding to the principal portion of the identical original image, or a region having a high probability of being a region corresponding to the principal portion of the identical original image and determined on the basis of the regions estimated to correspond to the principal portion and extracted respectively by the extracting methods; setting in advance a weight with respect to each of the extracting methods in correspondence with a result of evaluation; extracting regions estimated to correspond to a principal portion, respectively, from an original image from which the principal portion is to be extracted, by the extracting methods; weighting each of the extracted regions by the weight set for each of the extracting methods; and determining a region having a high probability of being a region corresponding to the principal portion of the original image, on the basis of a result of the weighting.

It should be noted that, as the extracting method referred to above, a method which is shown in a fifth aspect of the present invention, which will be described later, is specifically used.

In the above, the evaluation of the extracting methods may be made by a person or automatically by the apparatus. In a case where the evaluation is made by a person, it is preferable to make a comparison between the regions which have been respectively extracted from the same original image by the extracting methods and are estimated to correspond to the principal portion and a region corresponding to the actual principal portion of the same original image. In a case where the evaluation is made by the apparatus, the evaluation can be realized by automatically determining a region having a high probability of being a region corresponding to the principal portion on the basis of the regions extracted respectively by the extracting methods and estimated to correspond to the principal portion (this determination can be made, for example, on the basis of results of weighting of the regions extracted by the extracting methods in the same way as described above), and by comparing the regions estimated to correspond to the principal portion and extracted respectively from the identical original image by the extracting methods with the determined region having a high probability of being a region corresponding to the principal portion of the identical original image. Further, only the designation of a region corresponding to the principal portion of the original image may be effected by a person, and the other processing may be effected automatically.

In addition, in the evaluation of the extracting methods, while the extraction of principal portions is being carried out with respect to a plurality of original images from which the principal portions are to be extracted, information necessary for making the aforementioned evaluation may concurrently be stored, and the extracting methods may be thereby evaluated by using the plurality of original images from which the principal portions are to be extracted.

Alternatively, the extracting methods may be evaluated by using a plurality of original images prepared separately for evaluation of the extracting methods. In the case where the plurality of original images prepared separately for evaluation are used, the ratio of images having various image contents in the plurality of original images is preferably set to be equal to substantially equal to the ratio of images having various image contents in the original images from which principal portions are to be extracted.

In the above, the extracting methods are evaluated in correspondence with the ratio of the images having various image contents in the original images from which principal portions are to be extracted (specifically, that ratio of images having image contents which makes it possible to extract principal portions reliably and appropriately in the respective extracting methods), and a weight corresponding to the ratio is set for each extracting method. Incidentally, the evaluation of the extracting methods and the determination of weights are preferably made such that high degrees of coincidence are obtained in terms of the degrees to which characteristic amounts of an image of the region extracted as a region estimated to correspond to the principal portion coincide with those of a region serving as an object to be compared with (a region which has a high probability of being a region corresponding to the principal portion and has been determined on the basis of the region corresponding to the principal portion or on the basis of the regions extracted respectively by the extracting methods and estimated to correspond to the principal portion), and such that the weight of an extracting method having a high probability of yielding a high degree of coincidence with respect to a plurality of images becomes large. The aforementioned characteristic amounts of an image of the region extracted as a region estimated to correspond to the principal portion include, for example, the position, shape, and size of that region, an average density, a maximum value, a minimum value, and an intermediate value of the density, a density value in a peak of a density histogram, and a density value when an accumulation frequency from a maximum or minimum value of the density is a predetermined value.

In the above-described first aspect, when a region having a high probability of corresponding to the principal portion is extracted from the original image, each of the extracted regions extracted respectively by the extracting methods from the original image from which the principal portion is to be extracted is weighted by the weight set for each of the extracting methods, and a region having a high probability of being a region corresponding to the principal portion of the original image is determined on the basis of the result of the weighting. Accordingly, the region corresponding to the principal portion of the original image can be determined appropriately with a high probability by an extracting method having a large weight imparted thereto.

In addition, even in a case where it was impossible to extract a region corresponding to the actual principal portion as a region estimated to correspond to the principal portion by the extracting method having a large weight imparted thereto, that region is extracted as the region estimated to correspond to the principal portion by another extracting method, and that region is weighted. Hence, there is a high possibility that the aforementioned region is determined as the region having a high probability of being a region corresponding to the principal portion.

Further, in a case where a region in which a region corresponding to a non-principal portion and a region corresponding to a principal portion are present in a mixed form has been extracted by the extracting method having a large weight imparted thereto, or in a case where a region constituted only by a region corresponding to a non-principal portion has been extracted, there is a low possibility that the aforementioned region corresponding to the non-principal portion is extracted as a region estimated to correspond to the principal portion by other extracting methods. Consequently, there is a low possibility that the weight of the region corresponding to the non-principal portion becomes large as a result of weighting, and there is a low possibility that the region corresponding to the non-principal portion is determined as the region having a high probability of being a region corresponding to the principal portion.

Accordingly, even in cases where it was impossible to appropriately extract a region corresponding to the principal portion by the extracting method having a large weight imparted thereto, there is a high probability that the region corresponding to the principal portion can be determined appropriately by the result of extraction by another extracting method. Thus, a decision by one extracting method is mutually complemented by a decision by another extracting method, so that the region corresponding to the principal portion of the original image can be determined appropriately with a high probability.

In accordance with a second aspect of the present invention, there is provided a method of determining a principal portion of an image according to the above-described first aspect, wherein when the region having the high probability of being the region corresponding to the principal portion of the original image has been determined, information related to the region extracted by each of the extracting methods and information related to the determined region are stored, and wherein, at a predetermine timing, each of the extracting methods is reevaluated on the basis of the stored information and the weight for each of the extracting methods is corrected.

As the information related to the region estimated to correspond to the principal portion and the information related to a region having a high probability of being a region corresponding to the principal portion, it is possible to use, for example, information for evaluating the extracting methods and determining the weights, such as information representing the position, shape, and size of that region of the original image, and information representing characteristic amounts of an image in that region of the original image (e.g., an average density, a maximum value, a minimum value, and an intermediate value of the density, a density value in a peak of a density histogram, and a density value when an accumulation frequency from a maximum or minimum value of the density is a predetermined value, and a frequency in a specific density range in the density histogram, and so on). In addition, the storage of the aforementioned information may be effected each time a region having a high probability of being a region corresponding to the principal portion is determined, or may be effected once each time a predetermined number of the aforementioned determinations have been carried out. In addition, the aforementioned predetermined timing may be, for example, each time a predetermined period of time has elapsed, or each time a fixed volume of information has been stored.

In accordance with the above-described second aspect, at a predetermine timing, each of the extracting methods is reevaluated on the basis of the stored information and the weight for each of the extracting methods is corrected. Therefore, even if, due to such as a change in the ratio of images having various image contents in the original images from which principal portions are to be extracted, a change has occurred in the extracting method which permits a region exhibiting a high degree of coincidence with the region corresponding to the actual principal portion to be extracted with a high probability as a region estimated to correspond to the principal portion, i.e., the extracting method whose weight should be increased, the weight for each extracting method is corrected in correspondence with that change. Accordingly, regions corresponding to the principal portions of original images can be determined appropriately with a high probability irrespective of a change and the like in the ratio of images having various image contents in the original images from which the principal portions are to be extracted.

In accordance with a third aspect of the present invention, there is provided a method of determining a principal portion of an image, comprising the steps of: extracting, from an identical original image, regions estimated to correspond to a principal portion thereof, respectively, by means of a plurality of mutually different extracting methods for extracting from an original image a region estimated to correspond to a principal portion thereof, and evaluating the extracting methods by comparing with respect to a plurality of original images, on the one hand, the regions estimated to correspond to the principal portion and extracted respectively from the identical original image by the extracting methods and, on the other hand, a region corresponding to the principal portion of the identical original image, or a region having a high probability of being a region corresponding to the principal portion of the identical original image and determined on the basis of the regions estimated to correspond to the principal portion and extracted respectively by the extracting methods; setting in advance a priority with respect to each of the extracting methods in correspondence with a result of evaluation; extracting a region estimated to correspond to a principal portion from an original image from which the principal portion is to be extracted, by an extracting method of a high priority; determining a region having a high probability of being a region corresponding to the principal portion of the original image, on the basis of a result of the extraction by the extracting method of the high priority; extracting further a region estimated to correspond to the principal portion from the determined region, by an extracting method of a low priority; and determining again a region having the high probability of being the region corresponding to the principal portion of the original image, on the basis of a result of the extraction by the extracting method of the low priority.

In the above, in the same way as in the first aspect of the present invention, the respective extracting methods are evaluated, and priorities for the respective extracting methods. It should be noted that the priorities may be determined according to the same criteria as that for the weights in the first aspect of the invention. Alternatively, the priorities may be determined such that a high priority is imparted to an extracting method having a low probability of being incapable of extracting the region serving as an object to be compared with (a region which has a high probability of being a region corresponding to the principal portion of the original image and has been determined on the basis of the region corresponding to the principal portion of the original image or on the basis of the regions extracted respectively by the extracting methods and estimated to correspond to the principal portion) as a region estimated to correspond to the principal portion, i.e., such that a high priority is imparted to an extracting method having a high probability that the region serving as the object to be compared with is included among the regions extracted as regions estimated to correspond to the principal portion. In addition, if a plurality of extracting methods whose results of evaluation are of the same level are present, a priority of the same level may be set for these extracting methods.

In the third aspect, when a region having a high probability of corresponding to the principal portion is extracted from an original image, a region estimated to correspond to the principal portion is extracted from the original image from which the principal portion is to be extracted, by an extracting method of a high priority, and a region having a high probability of being a region corresponding to the principal portion of the original image is determined on the basis of the result of the extraction by the extracting method of the high priority. Incidentally, in a case where the aforementioned high priority has been set only for a single extracting method, a region estimated to correspond to the principal portion may be extracted by the single extracting method, and the extracted region may be determined as the region having a high probability of being a region corresponding to the principal portion.

On the other hand, in a case where the high priority has been set for a plurality of extracting methods, regions estimated to correspond to the principal portion may be respectively extracted by the plurality of extracting methods, and only the regions which have been extracted as regions estimated to correspond to the principal portion by the plurality of extracting methods may, for instance, be determined as regions having a high probability of being regions corresponding to the principal portion on the basis of the results of extraction by the plurality of extracting methods. Alternatively, the regions extracted by the plurality of extracting methods may be respectively weighted in the same way as in the first aspect, and a region having the high probability of being a region corresponding to the principal portion may be determined on the basis of the results of weighting.

Further, in the above-described third aspect, a region estimated to correspond to the principal portion is further extracted from the determined region having a high probability of being a region corresponding to the principal portion, by an extracting method of a low priority, and a region having the high probability of being the region corresponding to the principal portion of the original image is determined again on the basis of the result of extraction by the extracting method of the low priority. Incidentally, in a case where the aforementioned low priority has been set only for a single extracting method, in the same way as described above, a region estimated to correspond to the principal portion may be extracted from the aforementioned determined region by the single extracting method, and the extracted region may be determined as the region having a high probability of being a region corresponding to the principal portion. On the other hand, in a case where the low priority has been set for a plurality of extracting methods, regions estimated to correspond to the principal portion may be respectively extracted by the plurality of extracting methods, and a region having a high probability of being a region corresponding to the principal portion may be determined on the basis of the results of extraction by the plurality of extracting methods.

Consequently, a region corresponding to the principal portion of the original image can be determined appropriately with a high probability on the basis of the result of extraction by the extracting method of a high priority. For example, even in a case where a region in which a region corresponding to a non-principal portion and a region corresponding to a principal portion are present in a mixed form, or a region constituted only by a region corresponding to a non-principal portion, has been extracted as a region having a high probability of being a region corresponding to the principal portion on the basis of the result of extraction by an extracting method of a high priority, there is a low possibility that the aforementioned region corresponding to the non-principal portion is extracted as a region estimated to correspond to the principal portion by an extracting method of a lower priority. Consequently, there is a low possibility that the region corresponding to the non-principal portion is determined as the region having a high probability of being a region corresponding to the principal portion.

Accordingly, even in cases where it was impossible to appropriately determine a region corresponding to the principal portion on the basis of the result of extraction by the extracting method of a high priority, there is a high probability that the region corresponding to the principal portion can be determined appropriately on the basis of the result of extraction by an extracting method of a low priority. Thus, the drawback of the extracting method of a high priority is compensated for by the extracting method of a low priority, so that the region corresponding to the principal portion of the original image can be determined appropriately with a high probability.

In addition, in the third aspect, the extracting method of the lower priority extracts a region estimated to correspond to the principal portion from the region determined on the basis of the region extracted by the extracting method of the high priority. Therefore, it is possible to shorten the processing time as compared with a case where the region estimated to correspond to the principal portion is extracted by using the overall original image as an object. In addition, in a case where the levels of the priorities of the extracting methods are classified into three levels or more, the processing in which a region estimated to correspond to the principal portion is extracted from the region determined in a preceding stage, by an extracting method of a lower priority than that of the preceding stage, may be repeated a plurality of times in a descending order of the priority of the extracting method which executes the processing.

In addition, in a case where a plurality of extracting methods of an identical and high priority are present, even in a case where it was impossible to extract a region corresponding to the actual principal portion by a particular extracting method of a high priority, for example, there is advantageously a high possibility that the aforementioned region is extracted by another extracting method of a high priority, and that the aforementioned region is determined to be a region having a high probability of being a region corresponding to the principal portion.

In accordance with a fourth aspect of the present invention, there is provided a method of determining a principal portion of an image according to the above-described third aspect, wherein, at a first predetermined timing, regions estimated to correspond to the principal portion are respectively extracted from the original image by the extracting methods, a region having the high probability of being the region corresponding to the principal portion of the original image is determined on the basis of a result the extraction, and information related to the regions extracted respectively by the extracting methods and information related to the determined region are stored, and wherein, at a second predetermined timing, each of the extracting methods is reevaluated on the basis of the stored information, and the priority for each of the extracting methods is corrected.

The first predetermined timing may be, for example, each time regions having high probabilities of being regions corresponding to the principal portions have been determined with respect to a predetermined number of original images. Meanwhile, the second predetermined timing may be each time a fixed period of time has elapsed or each tie a fixed volume of information has been stored.

In accordance with the above-described arrangement, since, at a second predetermined timing, each of the extracting methods is reevaluated on the basis of the stored information, and the priority for each of the extracting methods is corrected. Therefore, even if, due to such as a change in the ratio of images having various image contents in the original images from which principal portions are to be extracted, a change has occurred in the extracting method which permits a region exhibiting a high degree of coincidence with the region corresponding to the actual principal portion to be extracted with a high probability as a region estimated to correspond to the principal portion, or in the extracting method having a low probability of being incapable of extracting the region corresponding to the actual principal portion as a region estimated to correspond to the principal portion, i.e., the extracting method to which a high priority should be imparted, this change is reflected on the priority of each extracting method. Accordingly, regions corresponding to the principal portions of original images can be determined appropriately with a high probability irrespective of a change and the like in the ratio of images having various image contents in the original images from which the principal portions are to be extracted.

In accordance with a fifth aspect of the present invention, in the above-described aspects, the extracting method may include at least one of an extracting method for extracting a region of a particular color in the original image as the region estimated to correspond to the principal portion, an extracting method for extracting a region estimated to correspond to the principal portion by detecting a pattern of shape peculiar to the principal portion, and an extracting method for extracting a region estimated to correspond to the principal portion by eliminating a region estimated to correspond to a background.

A method of determining a copying condition in accordance with a sixth aspect of the present invention comprises the steps of: determining a region having a high probability of being a region corresponding to a principal portion with respect to an original image to be copied onto a copying material, by the method of determining a principal portion of an image according to any one of the above- described first to fifth aspects; and determining a copying condition for the original image such that the determined region having the high probability of being the region corresponding to the principal portion is copied appropriately.

As described above, in accordance with the method of determining a principal portion of an image according to any one of the above-described first to fifth aspects, a region corresponding to a principal portion of an original image can be determined appropriately with a high probability. In the above, since a copying condition for the original image to be copied onto a copying material is determined such that the determined region having the high probability of being the region corresponding to the principal portion is copied appropriately. Therefore, it is possible to obtain with a high probability the copying condition which permits the region corresponding to the principal portion of the image to be copied appropriately.

It should be noted that the copying condition which permits the region having a high probability of being a region corresponding to the principal portion to be copied appropriately can be obtained, for instance, by calculating a characteristic amount of an image at each portion of the original image to be copied as a characteristic amount of an image of the original image to be copied as a variable for a copying-condition calculating formula for determining the copying condition, such that the weight of the characteristic amount of an image at the aforementioned determined region having the high probability of being a region corresponding to the principal portion becomes high, and by substituting the result of calculating into the copying-condition calculating formula. In addition, the aforementioned copying condition can also be obtained, for example, by determining a correction amount for correcting the copying condition by using the characteristic amount of an image at the region having a high probability of being a region corresponding to the principal portion, and by correcting the copying condition determined by the aforementioned copying-condition calculating formula, by means of the aforementioned correction amount.

Even if the copying condition is determined as described above, there are cases where it is impossible to obtain a copying condition which permits a region corresponding to the principal portion to be copied appropriately. For instance, in a case where the original image is one in which the area of a region whose density is extremely high or low is large, i.e., in the case of an image in which a so-called density failure has occurred, the correction amount for the copying condition, to be precise, changes depending on the area of the region whose density is extremely high or low is large. The density failure or the like can be corrected to a certain extent if the copying condition is determined as described above, but in cases where, for example, the area of the region whose density is extremely high or low is large is extremely large, it is impossible to obtain an appropriate copying condition, so that the determined copying condition is sometimes corrected further by the operator or the like. For this reason, as for the correction amount for correcting the copying condition, it is preferable to determine this correction amount by the method in accordance with a seventh aspect of the present invention.

Namely, in accordance with the seventh aspect of the present invention, there is provided a method of determining a copying condition according to the above-described sixth aspect, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 1 to 5, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and the relationship, and the copying condition of the original image is determined by using the correction amount, wherein information representing the determined plurality of kinds of characteristic amounts of an image of the original image and information representing a finally used correction amount for the copying condition are stored, and wherein the relationship is updated at a predetermined timing on the basis of the information representing the plurality of kinds of characteristic amounts of an image stored with respect to the plurality of original images and the information representing the correction amount for the copying condition.

It should be noted that in a case where the determined copying condition has not been corrected, the finally used correction amount for the copying condition means the calculated correction amount, whereas in a case where the determined copying condition has been further corrected, the finally used correction amount for the copying condition means a correction amount in which a correction amount for the determined copying condition is added to the aforementioned calculated correction amount.

In the determination of the relationship between the plurality of kinds of characteristic amounts of an image and the correction amount for the copying condition, while the determination of the copying condition is being carried out with respect to a plurality of original images for which the copying condition is to be determined, information representing the plurality of kinds of characteristic amounts of an image and information on the plurality of original images which determined the copying condition may concurrently be stored, and the aforementioned relationship may be thereby determined by using information on the plurality of original images which determined the copying condition. Alternatively, the aforementioned relationship may be determined by using a plurality of original images prepared for determining the relationship separately from the original images to be copied. In the case where the plurality of original images prepared separately for determining the relationship are used, the ratio of images having various image contents in the plurality of original images is preferably set to be equal to substantially equal to the ratio of images having various image contents in the original images from which principal portions are to be extracted.

In the case where the relationship between the plurality of kinds of characteristic amounts of an image and the correction amount for the copying condition is determined by using a plurality of original images prepared separately from the original images to be copied, at least one of the plurality of kinds of the characteristic amounts of an image may be the characteristic amount of an image in the region recognized by a person as corresponding to the principal portion of the original image, or the characteristic amount of an image in the region which has been automatically determined on the basis of the regions estimated to correspond to the principal portion and extracted by the respective extracting methods, in the same way as in the first or third aspect, and has a high probability of being a region corresponding to the principal portion of the original image. In addition, as for the correction amount for the copying condition in this case, an ideal correction amount is preferably determined in advance through an experiment or the like.

Meanwhile, in the case where the relationship between the plurality of kinds of characteristic amounts of an image and the correction amount for the copying condition is determined by using the original images to be copied, at least one of the plurality of kinds of the characteristic amounts of an image may be the characteristic amount of an image in the region which has been automatically determined on the basis of the regions estimated to correspond to the principal portion and extracted by the respective extracting methods and has a high probability of being a region corresponding to the principal portion of the original image. In addition, as the correction amount for the copying condition in this case, the finally used correction amount for the copying condition may be used.

In addition, as the plurality of kinds of characteristic amounts of an image, it is possible to use, for instance, an average density of each region, such as a region corresponding to a principal portion of an original image, a region having a high probability of being a region corresponding to the principal portion, an entire region of the original image, and a region corresponding to a non- principal portion of the original image, as well as a maximum value, a minimum value, and an intermediate value of the density, a density value in a peak of a density histogram, and a density value when an accumulation frequency from a maximum or minimum value of the density is a predetermined value, and a frequency in a specific density range in the density histogram, and so on. Further, the relationship between the plurality of kinds of characteristic amounts of an image and the correction amount for the copying condition can be determined by a known technique such as multiple regression analysis on the basis of the plurality of kinds of characteristic amounts of an image determined with respect to a plurality of original images and correction amounts for copying conditions of the plurality of original images.

In addition, in the seventh embodiment, since the relationship between, on the one hand, a plurality of kinds of characteristic amounts of an image, including a characteristic amount of an image in a region corresponding to a principal portion of the original image or in a region having a high probability of being a region corresponding to the principal portion and, on the other, a correction amount for a copying condition, is determined, and the correction amount is corrected on the basis of the plurality of kinds of characteristic amounts of an image of the original image to be copied and that relationship. Accordingly, the characteristic amount of an image in a region other than the region corresponding to the principal portion of the original image is also taken into consideration. Hence, it is possible to obtain a correction amount for effecting correction in such a manner as to allow the region corresponding to the principal portion to be copied appropriately. As the copying condition is determined by using that correction amount, it is possible to obtain with a high probability a copying condition which permits a region corresponding to the principal portion to be copied appropriately.

Further, information representing the plurality of kinds of characteristic amounts of an image determined with respect to the original images which determined the copying condition, as well as information representing the finally used correction amount for the copying condition are stored, and the aforementioned relationship is updated at a predetermined timing (e.g., each time a fixed period of time has elapsed, or each time a fixed volume of information has been stored) on the basis of the information representing the plurality of kinds of characteristic amounts of an image stored with respect to the plurality of original images and the information representing the correction amount for the copying condition. Therefore, when the determined copying condition is further corrected, its correction amount is also stored as the finally used correction amount for the copying condition, and the correction amount for the determined copying condition is reflected on the aforementioned relationship at the time the relationship is updated.

Accordingly, since the aforementioned relationship is updated in such a manner as to improve the probability of obtaining an appropriate copying condition which does not require further correction of the determined copying condition, even if there is a high probability of a determined copying condition being further corrected due to such as a change in the ratio of images having various image contents in the original images to be copied, the correction amount for the determined copying condition is reflected on the aforementioned relationship, with the result that the probability of the determined copying condition being further corrected declines. Accordingly, it is possible to obtain with a high probability a copying condition which permits a region corresponding to the principal portion of an original image to be copied appropriately irrespective of a change and the like in the ratio of images having various image contents in the original images to be copied.

In accordance with an eighth aspect of the present invention, there is provided a method of determining a copying condition according to the above-described seventh aspect, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to to which one of the groups the original image to be copied belongs, the correction amount for the copying condition is calculated by using the relationship corresponding to the determined group, and the information representing the plurality of kinds of characteristic amounts of an image of the original image and the information representing the finally used correction amount for the copying condition are stored separately for each of the groups, and wherein the relationship is updated for each of the groups at a predetermined timing.

Generally, the correction amount for a copying condition differs depending on the contents of the image, and it is statistically known that, between an image whose background is dark and an image whose background is bright, for example, the direction of correction for the copying condition is in many cases opposite. In contrast, in the eighth embodiment, the original images are classified into a plurality of groups on the basis of a predetermined characteristic amount of an image (e.g., the density of a background portion in the above example), and the relationship between the plurality of kinds of characteristic amounts of an image and the correction amount for the copying condition is obtained for each of the groups. On the basis of the predetermined characteristic amount of an image, a determination is made as to to which one of the groups the original image to be copied belongs, and the correction amount for the copying condition is calculated by using the relationship corresponding to the determined group. Therefore, it is possible to obtain a correction amount capable of correcting the copying condition with a high degree of accuracy, and further improve the probability of obtaining an appropriate copying condition.

In a case where there has been no change in the ratio of images having various image contents in the original images to be copied, original images for which the determined copying condition is further corrected are in many cases images whose image contents are mutually similar. However, in a case where the ratio of this type of images in the original images to be copied is low and the probability of the determined copying condition being further corrected is therefore considerably low, the degree to which the correction amount for the determined copying condition is involved in the relationship between the plurality of kinds of the characteristic amounts and the correction amount of the copying condition becomes considerably low in the above-described case. Therefore, it is difficult to further reduce the probability of the determined copying condition being further corrected.

For this reason, in accordance with a ninth aspect of the present invention, there is provided a method of determining a copying condition according to the above-described seventh aspect, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that the images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of the original image, whereas in a case where it is determined that the determined copying condition is required to be further corrected, the correction amount for the copying condition is obtained by using the relationship obtained with respect to the original images for which the determined copying condition was corrected, so as to determine the copying condition.

In accordance with the ninth aspect, a determination is made as to whether or not an original image for which the determined copying condition is required to be further corrected and an original image for which the determined copying condition is not required to be corrected can be distinguished in advance on the basis of at least one of the plurality of kinds of characteristic amounts of an image. In a case where it is determined that the images can be distinguished in advance, a relationship between the plurality of kinds of characteristic amounts of an image and the correction amount for the copying condition concerning the original images for which the determined copying condition was further corrected is obtained. Since this relationship is obtained by using only the information on the original images for which the determined copying condition was further corrected, the degree to which the correction amount for the determined copying condition is involved in the relationship between the plurality of kinds of the characteristic amounts and the correction amount of the copying condition is very high. Therefore, even in a case where the probability of the determined copying condition being further corrected is considerably low, the aforementioned relationship is determined in such a manner that the determined copying condition will not be corrected with respect to the original images for which the determined copying condition is estimated to be further corrected.

Further, in the above-described ninth embodiment, with respect to the original image for which a determination is made that the determined copying condition is to be further corrected among the original images to be copied, the copying condition is determined by using the aforementioned relationship determined with respect to the original images for which the determined copying condition was corrected. Therefore, it is possible to obtain a correction amount capable of correcting the copying condition with a higher degree of accuracy with respect to an original image for which the determined copying condition is estimated to be further corrected. Accordingly, it is possible to considerably lower the probability of the determined copying condition being further corrected.

The above and other objects, features and advantages of the present invention will become more apparent from the following detailed description of the invention when read in conjunction with the accompanying drawings.

BRIEF DESCRIPTION OF THE DRAWINGS

FIG. 1 is a block diagram illustrating a schematic configuration of a photographic printing apparatus in accordance with the present invention;

FIG. 2 is a block diagram which conceptually shows a configuration of a control unit of the photographic printing apparatus;

FIG. 5A is an image diagram illustrating an example of an original image in the facial-region determination processing in accordance with the first embodiment;

FIG. 5B is an image diagram illustrating an example of results of extraction of face candidate regions by extracting units in the facial-region determination processing in accordance with the first embodiment;

FIG. 5C is an image diagram illustrating an example of a result of facial-region determination in the facial-region determination processing in accordance with the first embodiment;

FIG. 6B is a flowchart illustrating photographic printing processing in accordance with the second embodiment;

FIG. 7A is a flowchart illustrating facial-region determination processing in accordance with the second embodiment;

FIG. 7C is a flowchart illustrating the facial-region determination processing in accordance with the second embodiment;

FIG. 8 is the facial-region determination processing in accordance with the second embodiment, in which (A) is an image diagram illustrating an example of an original image, (B) is an image diagram illustrating an example of a result of extraction of a face candidate region by an extracting unit having a high priority, (C) is an image diagram illustrating an example of results of extraction of face candidate regions by extracting units having low priorities, and (D) is an image diagram illustrating an example of a result of facial-region determination;

DESCRIPTION OF THE PREFERRED EMBODIMENTS

Figure 3A:
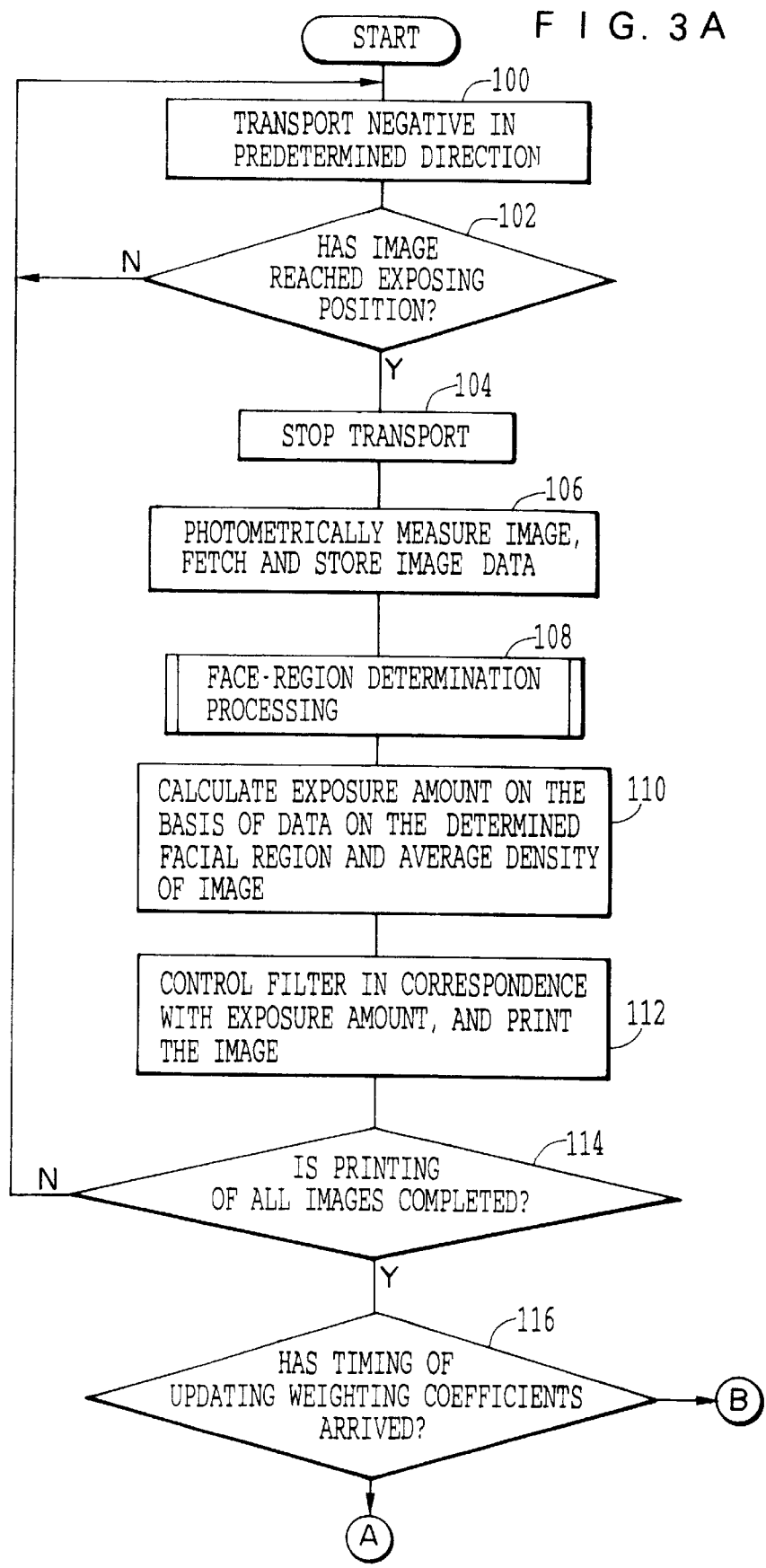
FIG. 3A is a flowchart illustrating photographic printing processing in accordance with a first embodiment.

Referring now to the accompanying drawings, a detailed description will be given of the embodiments of the present invention.

First Embodiment FIG. 1 shows a photographic printing apparatus 10 to which the present invention is applicable. The photographic printing 10 is provided with a light source 16 for emitting exposure light for printing an image recorded on a negative film 12. A color correction filter 18 such as a light-adjusting filter, a diffusion box 20, and a distributing prism 22 are arranged in order on the light-emitting side of the light source 16.

The path for transporting the negative film 12, which is a photographic film, is formed between the diffusion box 20 and the distributing prism 22, and the distributing prism 22 distributes the light transmitted through the negative film 12 into two directions. A pair of transport rollers 14A and 14B are provided on both sides of the optical axis of the light source 16 along the transport path of the negative film 12. The pair of transport rollers 14A and 14B are respectively connected to drive shafts of motors 52A and 52B, and are rotated as driving forces of the motors 52A and 52B are transmitted thereto, so as to transport the negative film 12.

A projection optical system 24, a black shutter 26, and a color paper (printing paper) 28 serving as a copying material are arranged in order on one optical path of the light distributed into two directions by the distributing prism 22. Meanwhile, a projecting optical system 30 and a CCD image sensor 32 are arranged in order on the other optical path. The CCD image sensor 32 divides the overall image (one frame) recorded on the negative film 12 into a multiplicity of pixels (e.g., 256×256 pixels), and spectrally separates each pixel into three colors, red (R), green (G), and blue (B) and photometrically measures the same.

An amplifier 34 for amplifying the signal outputted from the CCD image sensor 32, an analog-digital (A/D) converter 36, and a 3×3 matrix circuit 38 for correcting the sensitivity of the CCD image sensor 32 are serially connected to a signal output terminal of the CCD image sensor 32. The 3×3 matrix circuit 38 is connected to an input/output port 40D of a control unit 40 constituted by a microcomputer and its peripheral equipment. The control unit 40 has a CPU 40A, a ROM 40B, a RAM 40C, ad the input/output port 40D, which are interconnected via a bus.

In addition, the control unit 40 has a nonvolatile storage means 40E capable of rewriting its stored contents, such as an EEPROM or a RAM connected to a backup power supply. This storage means 40E is connected to the input/ output port 40D. Incidentally, the storage means 40E is not limited to the above types, and may be constituted by a nonvolatile storage medium capable of rewriting its stored contents, such as a floppy disk, a hard disk, a magneto-optic disk, and a memory card, and a driver for reading and writing information with respect to the storage medium.

The color correction filter 18 is connected to the input/output port 40D of the control unit 40 via a driver 46 for driving the color correction filter 18, and the motors 52A and 52B are also connected thereto via drivers 50A and 50B, respectively. Further connected to the input/output port 40D are a display 42 constituted by an LCD or a CRT, a keyboard 44 such as a tenkey pad for an operator to enter various information, and an image-plane detection sensor 48 disposed on both sides of the optical path of the light source 16 for detecting the amount of light transmitted through the negative film 12.

Next, a description will be given of the operation of this embodiment. The control unit 40 has a configuration such as the one shown conceptually in FIG. 2, and has n extracting units $56_1$ to $56_n$. Each of the extracting units $56_1$ to $56_n$ extracts a region (face candidate region) estimated to correspond to the face of a human figure as a principal portion in the present invention, from an image represented by inputted image data, according to any one of the n kinds of extracting methods (extracting methods 1 to n) which are mutually different. The extracting units $56_1$ to $56_n$ are respectively connected to a facial-region determining unit 58.

The n kinds of extracting methods which are executed by the n extracting units $56_1$ to $56_n$ include a plurality of kinds of facial-candidate extracting methods in which a region estimated to correspond to the face of a human figure in the image is determined, and that region is extracted as a face candidate region, as well as a plurality of kinds of background-portion eliminating methods in which a region (background region) estimated to correspond to a background in the image is determined, and a region other than the background region is extracted as the face candidate region. Specifically, it is possible to adopt at least one of the following facial-candidate extracting methods and background-portion eliminating methods which are conventionally known.

Example 1 of the Face-Candidate Extracting Method

On the basis of data (image data) obtained by dividing the image into a multiplicity of measuring spots and by spectrally separating the respective measuring spots into three colors of R, G, and B, a determination is made as to whether or not each measuring spot is included in the range of flesh color on the color coordinates. A region where there is a cluster of measuring points determined to be in the range of the flesh color is extracted as the face candidate region (refer to Japanese Patent Application Laid-Open Nos. 156624/1977, 156625/1977, 12330/1978, 145620/1978, 145621/1978, and 145622/1978).

Example 2 of the Face-Candidate Extracting Method

On the basis of the aforementioned image data, a histogram on hue values (and saturation values) is determined, and the determined histogram is divided into ridges. A determination is made as to to which of the divided ridges each measuring spot belongs, and each measuring spot is classified into groups corresponding to the divided ridges. The image is divided into a plurality of regions for each group, a region corresponding to the face of a human figure among the plurality of regions is estimated, and the estimated region is extracted as the face candidate region (refer to Japanese Patent Application Laid-Open No. 346333/1992).

Example 3 of the Face-Candidate Extracting Method

On the basis of the aforementioned image data, one of patterns of shape peculiar to various parts of a human figure which are present in an image (e.g., patterns of shape representing the contour of the head, the contour of the face, an internal structure of the face, the contour of the body) is searched. A region estimated to correspond to the face of a human figure is set in correspondence with the size and direction of the detected pattern of shape and the positional relationship between the face of the human figure and a particular portion of the human figure represented by the detected pattern of shape. In addition, another pattern of shape different from the detected pattern of shape is searched, and the match of the previously-set region to the face of a human figure is determined, thereby to extract a face candidate region (refer to Japanese Patent Application Laid-Open Nos. 265850/1994 and 266598/1994).

Example 1 of the Background-Portion Eliminating Method

On the basis of the aforementioned image data, a determination is made as to whether or not each measuring spot is included in the range of a particular color (e.g., a blue color of the sky or a sea, a green color of a turf or a tree, etc.) which clearly belongs to the background on the color coordinates. A region where there is a cluster of measuring points determined to be in the range of the particular color is eliminated as being a background region. The remaining region is extracted as a non-background region (a region having a high possibility that the region corresponding to the face of a human figure is included; this is also a face candidate region in the present invention).

Example 2 of the Background-Portion Eliminating Method

On the basis of the aforementioned image data, after dividing the image into a plurality of regions in the same way as in example 2 of the background-portion eliminating method, a characteristic amount (the ratio of a straight-line portion included in the contour, the degree of axial symmetry, the number of projections and recesses, the rate of contact with an outer periphery of the image, contrast in density within the region, the presence or absence of a pattern of change in the density within the region, etc.) as a region corresponding to the background is determined for each region. On the basis of the determined characteristic amount, a determination is made as to whether or not each region is a background region. A region which is determined to be a background region is eliminated, and the remaining region is extracted as a non-background region (face candidate region) (refer to Japanese Patent Application Laid-Open Nos. 265850/1994 and 266598/1994).

The above-described extracting methods are mere examples, and it goes without saying that any method is applicable insofar as it is an extracting method for extracting a principal portion from an image.

The facial-region determining unit 58 outputs image data to the respective extracting units $56_1$ to $56_n$, and instructs the execution of extraction processing. In addition, on the basis of the results of processing by the extracting units $56_1$ to $56_n$, the facial-region determining unit 58 determines a region (facial region) having a high probability of being a region corresponding to the face of a human figure in the image of the negative film 12, and outputs the result of determination to an exposure control unit 60. The exposure control unit 60 controls the respective portions of the photographic printing apparatus 10, and calculates an exposure amount (corresponding to a copying condition in the present invention) for appropriately printing the determined facial region onto the printing paper 28 on the basis of the result of determination by the facial-region determining unit 58. On the basis of the calculated exposure amount, the exposure control unit 60 controls the printing of the image recorded on the negative film 12 onto the printing paper 28.

Figure 3B:
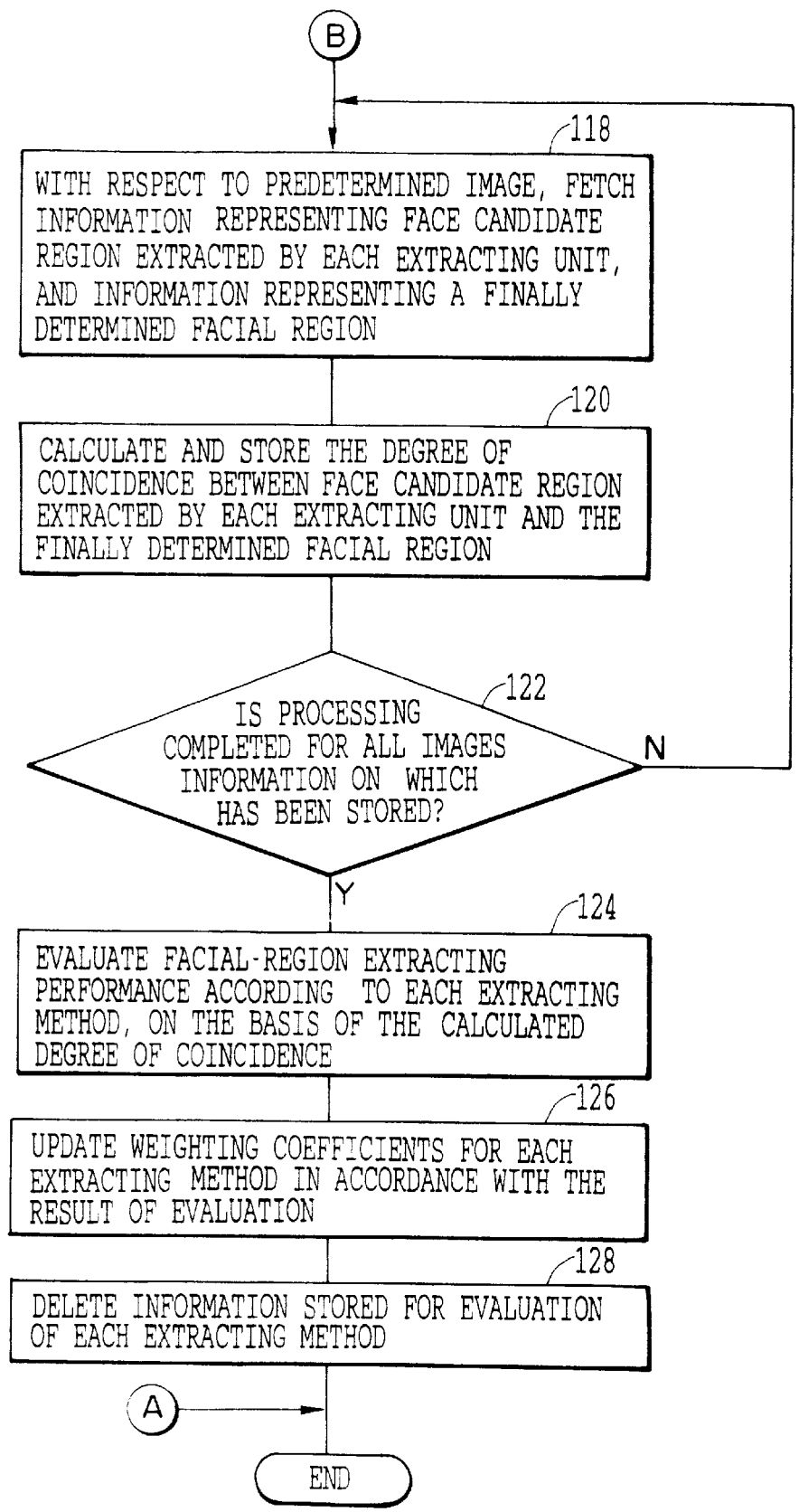
FIG. 3B is a flowchart illustrating photographic printing processing in accordance with the first embodiment.

Referring now to flowcharts in FIGS. 3A and 3B, a description will be given of printing processing in accordance with the first embodiment. Incidentally, the processing shown in FIGS. 3A and 3B is processing with respect to the exposure control unit 60 shown in FIG. 2, and is executed when the negative film 12, which has been subjected to processing such as development, is set in the photographic printing apparatus 10. In Step 100, the negative film 12 is transported. In Step 102, the position of the image recorded on the negative film 12 is detected by monitoring a signal outputted from the image-plane detection sensor 48, and a determination is made as to whether or not the image recorded on the negative film 12 has arrived at an exposing position. If NO is the answer in the determination, the operation returns to Step 100 to continue transporting the negative film 12.

Figure 4:
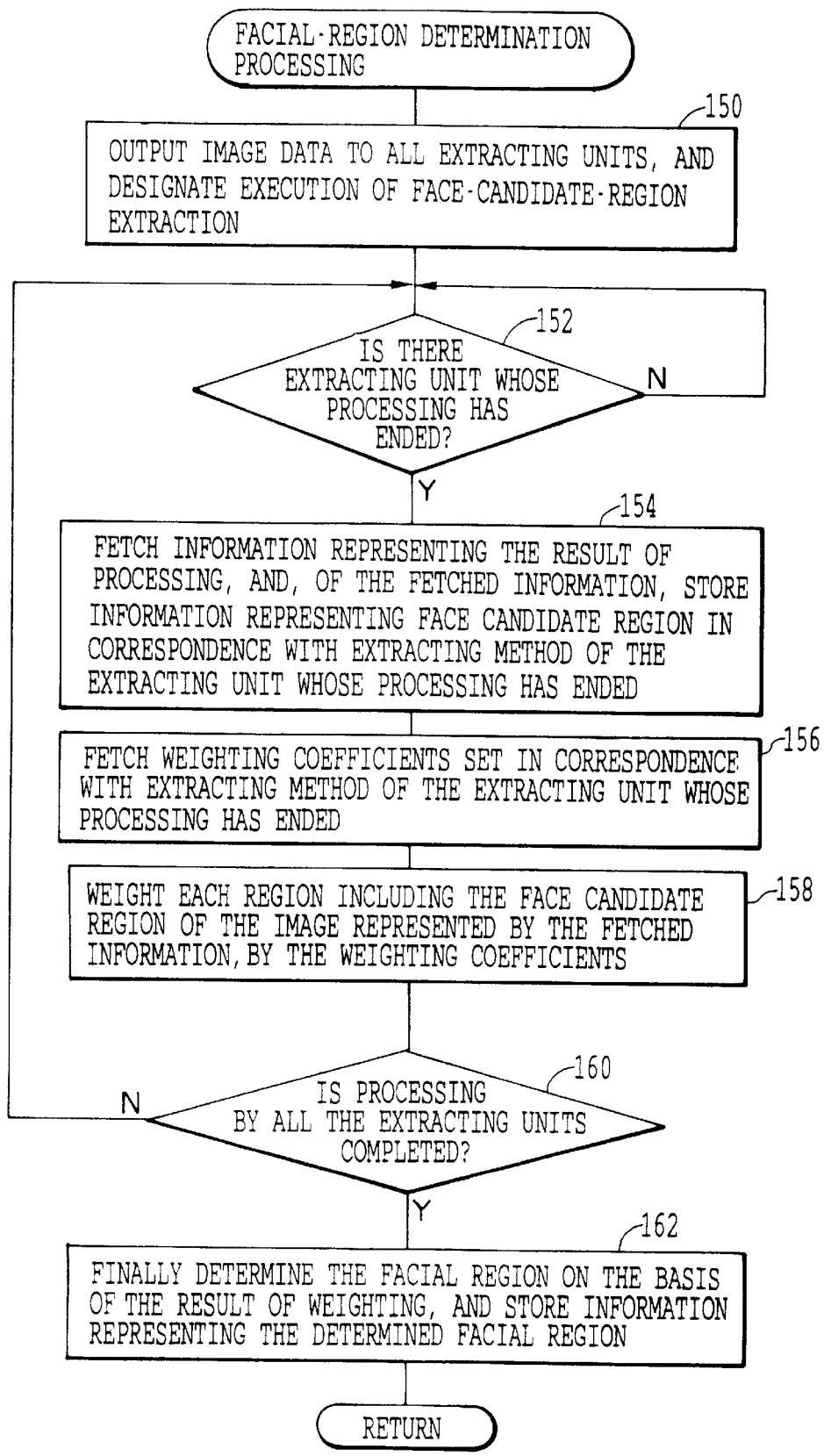
FIG. 4 is a flowchart illustrating facial-region determination processing in accordance with the first embodiment.

If YES is the answer in the determination in Step 102, the transport of the negative film 12 is stopped in Step 104, and the image which has arrived at the exposing position is positioned at the exposing position. In Step 106, the image positioned at the exposing position is subjected to photometry by the CCD image sensor 32. Then, image data for each of R, G, and B, which is outputted from the CCD image sensor 32 via the amplifier 34, the A/D converter 36, and the 3×3 matrix circuit 38. Further fetched image data is stored in a memory such as the RAM 40C. In an ensuing Step 108, facial-region determination processing is carried out. Referring to a flowchart in FIG. 4, a description will be given of this facial-region determination processing. Incidentally, this facial-region determination processing is processing with respect to the facial-region determining unit 58 shown in FIG. 2.

In Step 150, all the image data (image data for the entire image plane of the image) stored earlier in Step 106 is outputted to all the extracting units $56_1$ to $56_n$, and the execution of further extraction processing is instructed. As a result, in the extracting units $56_1$ to $56_n$, the extraction of face candidate regions is carried out in parallel by mutually different extracting methods by using the entire image plane of the image subjected to photometry earlier as a range subject to processing. In an ensuing Step 152, a determination is made as to whether or not there is an extracting unit 56 which finished extraction processing among the extracting units $56_1$ to $56_n$, and the operation waits until extraction processing is finished by any one of the extracting units.

If YES is the answer in the determination in Step 152, the operation proceeds to Step 154. In Step 154, information representing the result of extraction by the extracting unit 56 which finished extraction processing is fetched from the extracting unit 56, and, of the fetched information, information representing the extracted face candidate region is stored in the storage means 40E in correspondence with the extracting method (one of the extracting methods 1 to n) executed by the extracting unit 56. Incidentally, in this first embodiment, weighting coefficients are respectively set in advance for the extracting units 56 with respect to both the face candidate regions and the other non-face candidate regions (in the case where the extracting method of the extracting unit 56 is the background-portion eliminating method, a non-background region and a background region) which are extracted by the extracting units 56 (see Table 1).

TABLE 1

|  | Extracting Method | Weighting Coefficient |
|---|---|---|
| Extracting Unit 1 | face-candidate extracting method | face candidate region = $a_1$ non-face candidate region = $b_1$ |
| Extracting Unit 2 | background-portion eliminating method | face candidate region (non-background region) = $a_2$ non-face candidate region (background region) = $b_2$ |
| . | . | . |
| . | . | . |
| . | . | . |

The above weighting coefficients are set in advance as follows: A multiplicity of images having various image contents are prepared for evaluation of the respective extracting methods. The ratio of the images having various image contents in the multiplicity of images is set to be substantially equal to the ratio of images having various image contents in the images which are actually printed by the photographic printing apparatus 10. Various face candidate regions are extracted from the multiplicity of images prepared for evaluation according to the respective extracting methods. A comparison between each extracted face candidate region and a region corresponding to an actual face is made for each extracting method to determine the degree of coincidence. The facial-region extracting performance is evaluated for each extracting method (the evaluating method will be described later), and each weighting coefficient is determined on the basis of the result of evaluation.

As for the determination of the weighting coefficients based on the results of evaluation, the weighting coefficients for the respective regions including, for example, the face candidate region, the non-face candidate region, the non-background region, and the background region, are set as a precondition such that "the weighting coefficient of the face candidate region > the weighting coefficient of the non-background region > the weighting coefficient of the non-face candidate region > the weighting coefficient of the background region." Then, the weighting coefficients for the respective regions are set such that a high weight is imparted to an extracting method which was given a high evaluation (i.e., an extracting method in which a region having a high degree of coincidence with a region corresponding to an actual face was extracted as a face candidate region), in correspondence with the result of evaluation for each extracting method within a range which satisfies the precondition.

Incidentally, the reason that "the weighting coefficient of the face candidate region > the weighting coefficient of the non-background region" in the above precondition is because although the non-background region extracted as the face candidate region by the background-portion extracting method has a high probability of an actual facial region being present in that region, its probability of coincidence with the actual face is low.

In Step 156, the weighting coefficients set in correspondence with the extracting method executed by the extracting unit 56 which finished extraction processing are fetched. In an ensuing Step 158, the face candidate region and the non-face candidate region represented by the information fetched in Step 154 are weighted by the weighting coefficients fetched in Step 156. In Step 160, a determination is made as to whether or not extracting processing has been completed by all the extracting units 56, and if NO is the answer in the determination, the operation returns to Step 152. Consequently, each time extraction processing is finished by one of the extracting units $56_1$ to $56_n$, processing in Steps 154 to 158 is carried out.

If YES is the answer in the determination in Step 160, the operation proceeds to Step 162. At this point of time, as shown in FIG. 5B by way of example, each face candidate region is extracted from the original image shown in FIG. 5A by each extracting unit, and the regions are respectively weighted by the weighting coefficients set for the respective extracting methods. In Step 162, a facial region is finally determined on the basis of the result of the weighting just mentioned, and information representing the determined facial region is stored in the storage means 40E.

This determination is effected, for example, as follows: An overall weighting coefficient (which is determined by adding or multiplying the weighting coefficients respectively imparted in correspondence with the results of extraction by the extracting units) is determined for each portion of the image in correspondence with the results of extraction by the extracting units, and the image is divided into units of regions whose overall weighting coefficients are identical. Then, a region whose overall weighting coefficient is the highest (in the example of FIGS. 5A, 5B, and 5C, the region indicated by hatching) is determined to be a region having the highest probability of being a region corresponding to the facial region of a human figure (facial region). Incidentally, although FIG. 5C shows the case where a single region is determined to be a facial region, it goes without saying that there can be cases where a plurality of regions are determined to be facial regions depending on the content of the image.

It should be noted that, in the case where the overall weighting coefficient is determined by the addition of the weighting coefficients, it is desirable to set the weighting coefficients for the respective regions shown in Table 1 such that the precondition that "the weighting coefficient of the face candidate region and the weighting coefficient of the non-background region > 0, and the weighting coefficient of the background region < 0" is satisfied. For example, in a case where a specific region which was extracted as a face candidate region in the face-candidate extracting method used by one extracting unit is determined to be a background region in the background-portion eliminating method used by another extracting unit, the reliability of the specific region being a region corresponding to the face of a human figure is low. However, if, as described above, a precondition is provided such that "the weighting coefficient of the background region < 0," the overall weighting coefficient of the specific region becomes a low value, and is hence prevented from being erroneously determined as being a facial region.

On the other hand, in the case where the overall weighting coefficient is determined by the multiplication of the weighting coefficients, a precondition may be provided such that, of the weighting coefficients for the respective regions shown in Table 1, "the weighting coefficient of the non-face candidate region and the weighting coefficient of the background region = 0. In this case, the overall weighting coefficient of the region which is determined to be a non-face candidate region or a background region by one of the extracting units $56_1$ to $56_n$ becomes 0 irrespective of the results of extraction processing by the other extracting units.

Since the weighting coefficients for the extracting methods are set such that a high weighting coefficient is imparted to an extracting method whose facial-region extracting performance is high, as described above, an actual facial region can be determined appropriately with a high probability by an extracting method having a large weight. Even in a case where it was impossible to extract the actual facial region appropriately by the extracting method having a large weight, the probability of being able to determine the actual facial region appropriately by the result of extraction by another extracting method is high. Hence, it is possible to determine the actual facial region with a high probability.

This completes the facial-region determination processing, and the operation proceeds to Step 110 in the flowchart in FIG. 3A. In Step 110, an average density Di (i=one of R, G, and B) of the image plane is calculated on the basis of the image data stored in Step 106. Then, an exposure amount $E_i$ is calculated in accordance with the following formula by using the average density $D_i$ of the image plane and the photometric data on R, G, and B of the facial region determined earlier in the facial-region determination processing:

$$\log E_i = LM_i \cdot CS_i \cdot (DN_i - D_i) + PB_i + LB_i + MB_i + NB_i + K_1 + K_2 \tag{1}$$

where the respective symbols are defined as follows:

LM: magnification slope coefficient. The magnification slope coefficient is preset in correspondence with an enlarging magnification which is determined by the type of negative film and the print size.

CS: color slope coefficient. The color slope coefficients are prepared for each type of negative film, and include one for underexposure and another for overexposure. A determination is made as to whether the average density of an image frame to be printed is underexposed or overexposed with respect to a density value of a standard negative, and either a coefficient for underexposure or a coefficient for overexposure is selected.

DN: density value of a standard negative.

D: density value of an image frame to be printed.

PB: value of correction balance with respect to a standard color paper. This value is determined in correspondence with the type of color paper.

LB: value of correction balance with respect to a standard printing lens. This value is determined in correspondence with the type of lens used in printing.

MB: correction value (master balance value) with respect to fluctuations in the quantity of light of the light source or a change in the paper developing performance.

NB: negative balance (color balance) which is determined by the characteristics of the negative film.

$K_2$: color correction amount.

$K_1$: density correction amount expressed by the following formula:

$$Ka \left\{ \frac{D_R + D_G + D_B}{3} - \frac{FD_R + FD_G + FD_B}{3} \right\} + Kb$$

where Ka and Kb are constants, and DF is an average density of the facial region.

Alternatively, the density correction amount $K_1$ in Formula (1) above may be set to be a correction value determined by a film examining device, and the color correction amount $K_2$ may be expressed by using the average density of the facial region as follows:

$$(K_2)_i = Kc \left\{ \left( FD_i - \frac{FD_R + FD_G + FD_B}{3} \right) - \left( DN_i - \frac{DN_R + DN_G + DN_B}{3} \right) \right\}$$

where Kc is a constant.

Further, the exposure amount may be determined by setting the density correction amount $K_1$ and the color correction amount $K_2$ in Formula (1) above as correction amounts determined by a film examining device, and by substituting the average density D of the print frame in Formula (1) by an average density FD of the facial region. In addition, a weighted average value may be determined by weighting the density (or color) for each pixel of the region determined to be a facial region in the facial-region determination processing in correspondence with the weighting coefficient. Then, by calculating the exposure amount E by using that weighted average value instead of the average density D of the image plane, the weighting coefficient imparted to the region determined to be a facial region may be reflected on the exposure amount E.

Further, the exposure amount $E_i$ may be calculated as follows: By using only the overall weighting coefficients for the respective portions in the image determined in Step 162 in the flowchart of FIG. 4 as the result of facial-region determination, characteristic amounts of the image, such as an average density, a maximum value, a minimum value, or an intermediate value of the density, a density value in a peak of a density histogram, a density value when an accumulation frequency from a maximum or minimum value of the density is a predetermined value, and a frequency in a specific density range in the density histogram, are determined in units of portions whose overall weighting coefficients are identical, on the basis of the density of each pixel or the density of a unit area larger than one pixel. Then, the characteristic amounts of the image determined in units of the portions are weighted by the overall weighting coefficients and are accumulated, and the exposure amount $E_i$ is calculated by using the result of accumulation as the density D or the correction amounts $K_1$ and $K_2$ in Formula (1). In this case, to ensure that the effect exerted on the exposure amount E by the characteristic amounts of the image at a particular portion of the image (a portion whose weight is large due to the overall weighting coefficient) does not become excessively large, in the calculation of the overall weighting coefficients in Step 162 in the flowchart of FIG. 4, it is preferable to effect discarding if the overall weighting coefficient has exceeded a predetermined threshold, or effect clipping or the like by providing an upper limit or a lower limit.

After the exposure amount E is calculated as described above, In Step 112, the exposure amount E calculated above is outputted to the driver 46. Consequently, on the basis of the inputted exposure amount E the driver 46 moves the color correction filter 18 to the position corresponding to the exposure amount E. Further, the control unit 40 opens the black shutter 26 for a predetermined time duration which is determined by the exposure amount E. As a result, the image which has been positioned at the exposing position is printed onto the printing paper 28 with the aforementioned exposure amount E. In an ensuing Step 114, a determination is made as to whether or not all the images recorded on the negative film 12 have been printed. If NO is the answer in the determination, the operation returns to Step 100 to repeat the foregoing processing. If YES is the answer in the determination in Step 114, the operation proceeds to Step 116.

In Step 116, a determination is made as to whether or not a timing for updating the weighting coefficients (the predetermined timing in the above-described second aspect of the invention) has arrived. As for this determination, if, after the previous updating of weighting coefficients, a predetermined period has elapsed or a predetermined number of negative films 12 to be processed has been reached, or if the number of images printed on the printing paper 28 has reached a predetermined number, a determination is made that the updating timing has arrived, and YES is hence given as the answer. If NO is the answer in the determination, processing ends, but if YES is the answer in the determination, the operation proceeds to Step 118.

In Step 118, information representing face candidate regions extracted by the respective extracting units $56_1$ to $56_n$ with respect to a predetermined image, as well as information representing a facial region which has been finally determined with respect to the predetermined image, is fetched from the information stored in the storage means 40E. In an ensuing Step 120, the degrees to which the numbers of face candidate regions respectively extracted by the extracting units $56_1$ to $56_n$, their positions, and their shapes coincide with those of the finally determined facial region (degrees of coincidence) are respectively determined on the basis of the information fetched in the preceding step, and the results are stored.

In Step 122, a determination is made as to whether or not the processing in Steps 118 and 120 has been effected with respect to all the images the information on which has been stored in the storage means 40E. If NO is the answer in the determination, the operation returns to Step 118 to repeat the processing of Steps 118 and 120 with respect to all the images the information on which has been stored in the storage means 40E. If YES is the answer in the determination in Step 122, the operation proceeds to Step 124, in which the facial-region extracting performance of the extracting methods of the extracting units $56_1$ to $56_n$ is evaluated on the basis of the degrees of coincidence calculated for the respective images. In an ensuing Step 126, the weighting coefficients for the respective extracting methods are updated in accordance with the results of evaluation.

Incidentally, as for the evaluation of the facial-region extracting performance and the updating of the weighting coefficients, an evaluation is made that the facial-region extracting performance is high in the case of an extracting method by which high degrees of coincidence have been obtained with a high probability with respect to a large number of images, and the weighting coefficients are finely adjusted such that the weight of the face candidate region extracted by that extracting method becomes larger. On the other hand, in the case of the extracting method by which low degrees of coincidence have been obtained with respect to a multiplicity of images, an evaluation is made that its facial-region extracting performance is low, and the weighting coefficients are finely adjusted such that the weight of the face candidate region extracted by that extracting method becomes smaller.

In an ensuing Step 128, the weighting coefficients updated in the preceding step are stored in the storage means 40E, and the information (information fetched in Step 118) which was stored in the storage means 40E to evaluate the facial-region extracting performance of each extracting method is deleted, and the processing ends.

The ratio of images having various image contents in the images which are requested to be photographically processed and are subjected to processing such as printing by the photographic printing apparatus 10 changes depending on a season and the like, just as, for example, the ratio of images in which human figures with suntanned faces have been photographed increases during the summer. Also, the aforementioned ratio can possibly change depending on the country or district where the photographic printing apparatus 10 is installed. In contrast, as described above, since the facial-region extracting performance of the respective extracting methods is periodically evaluated, and the weighting coefficients are updated on each such occasion, even if the ratio of images having various image contents in the images which are processed by the photographic printing apparatus 10 changes, or the aforementioned ratio is different from those in other countries or districts, the weighting coefficients are updated in such a manner as to increase the weight of an extracting method which is able to extract regions of high degrees of coincidence with an actual facial region with a high probability with respect to a large number of images as face candidate regions. Hence, in the facial-region determination processing in Step 108 of FIG. 3A, it is possible to determine a region corresponding to the face of a human figure in each image with a high probability irrespective of the ratio of images having various image contents. In addition, since the exposure amount is calculated by placing emphasis on the color or density of the determined facial region, it is possible to obtain an exposure amount with which the portion corresponding to the face of the human figure in the image can be printed appropriately.

In the above description, information representing the face candidate regions extracted by the various extracting methods and the finally determined facial region is stored in advance, the degrees to which the numbers of face candidate regions respectively extracted by the extracting methods, their positions, and their shapes coincide (degrees of coincidence) are respectively determined on the basis of the aforementioned information, so as to evaluate the facial-region extracting performance of each extracting method. The present invention is not limited to the same, and an arrangement may be provided such that information representing characteristic amounts of an image of the face candidate regions extracted by the various extracting methods and the finally determined facial region is stored in advance, a comparison is made between the characteristic amount of the image of the finally determined facial region and characteristic amounts of the image of the face candidate regions respectively extracted by the various extracting methods, and degrees of coincidence of these characteristic amounts of the image are determined, so as to evaluate the facial-region extracting performance of each extracting method.

In addition, in the above description, the arrangement provided is such that information for evaluating the facial-region extracting performance of each extracting method (in the above, information representing face candidate regions, and information representing a finally determined facial region) is stored in advance with respect to all the images subjected to printing. The present invention is not limited to the same, and an arrangement may be provided such that the aforementioned information is stored each time a predetermined number of images have been printed, for example. Thus, the storage capacity of the storage means 40E necessary for storing the aforementioned information can be made small. Furthermore, the storage capacity of the storage means 40E can also be made small if, periodically, an intermediate evaluation of the facial-region extracting performance of each extracting method is made on the basis of the information stored in the storage means 40E, the information stored in the storage means 40E is concurrently deleted, and each time the intermediate evaluation has been carried out a predetermined number of times, the intermediate evaluations up till then are integrated to evaluate the facial-region extracting performance of each extracting method.

In addition, although, in the above, a description has been given of an example in which extraction processing by the extracting units $56_1$ to $56_n$ is executed in parallel, the present invention is not limited to the same, and the extraction processing by the extracting units $56_1$ to $56_n$ may be executed consecutively.

Second Embodiment

Next, a description will be given of a second embodiment of the present invention. It should be noted that since this second embodiment has a configuration similar to that of the first embodiment, the respective parts will be denoted by the same reference numerals, and a description of the configuration will be omitted. Hereafter, a description will be given of a portion of the operation of the second embodiment which differs from the first embodiment.

In this second embodiment, weighting coefficients are set with respect to the extracting methods executed by the extracting units $56_1$ to $56_n$ in the same way as in the first embodiment, and priorities of execution of the respective extracting methods are set in advance. As for the priorities, the facial-region extracting performance of each extracting method is evaluated in the same way as in the determination of the weighting coefficients described in the first embodiment, and the priorities are set such that a high priority is given to an extracting method whose facial-region extracting performance is high. Accordingly, if there are a plurality of extracting methods whose facial-region extracting performances are at the same level, the same priority is imparted to these extracting methods.

Next, referring to flowcharts shown in FIGS. 6A and 6B, a description will be given of printing processing in accordance with the second embodiment. In Steps 100 to 106, in the same way as in the first embodiment, the negative film 12 is transported, the image recorded on the negative film 12 is positioned at the exposing position, the positioned image is photometrically measured by the CCD image sensor 32, and the image data obtained by photometry is stored in the RAM 40C or the like. In an ensuing Step 109, facial-region determination processing is executed. A description will be given of this facial-region extracting performance with reference to flowcharts shown in FIGS. 7A to 7C.

In Step 148 in FIG. 7A, a determination is made as to whether or not a timing for storing data (the first predetermined timing in the above-described fourth aspect of the invention) which is used for evaluation of the facial-region extracting performance of the extracting methods and for updating the priorities has arrived. Incidentally, as for this determination, if, after the previous storage of the aforementioned data, a predetermined period has elapsed or a predetermined number of negative films 12 to be processed has been reached, or if the number of images printed on the printing paper 28 has reached a predetermined number, a determination is made that the storage timing has arrived, and YES is hence given as the answer.

At normal times when the data storage timing has not arrived, NO is given as the answer in the determination in Step 148, and the operation proceeds to Step 170. In Step 170, the priorities which have been respectively imparted to the extracting units are fetched. In an ensuing Step 172, the image data on an entire image plane portion of the image is outputted to all the extracting units with the highest priority imparted thereto (the relevant extracting units may be one, a plurality of, or all of the extracting units), and execution of extraction processing is instructed. Consequently, extraction processing is effected only by the extracting unit 56 with the highest priority imparted thereto by using the entire image plane of the image as a range subject to processing.

In an ensuing Step 174, a determination is made as to whether or not extraction processing by the extracting unit, to which the execution of extraction processing was instructed, has been finished, and the operation waits until the extraction processing ends. If YES is the answer in the determination in Step 174, information representing the result of extraction by the extracting unit 56 which finished the extraction processing is fetched from the extracting unit 56 in Step 176. In an ensuing Step 178, the weighting coefficients set in correspondence with the extracting method executed by the extracting unit 56 which finished the extraction processing are fetched. In Step 180, t h e face candidate region and the non-face candidate region represented by the information fetched in step 176 are weighted by the weighting coefficients fetched in Step 178.

In Step 182, a determination is made as to whether or not the extraction processing has been completed by all the extracting units 56 to which the execution of the extraction processing has been instructed, and if NO is the answer in the determination, the operation returns to Step 174. Incidentally, in a case where the execution of the extraction processing has been instructed to only one extracting unit 56, YES is unconditionally given as the answer in this determination. Meanwhile, in a case where another extracting unit 56 which is still executing the extracting processing is present, NO is given as the answer in the determination, and the operation returns to Step 174. If extraction processing has been finished, the processing in Steps 176 to 180 is carried out again.

If YES is the answer in the determination in Step 182, the operation returns to Step 184. At this point of time, as shown in (B) of FIG. 8 by way of example, a face candidate region is extracted from an original image shown in (A) of FIG. 8 by an extracting unit with the highest priority imparted thereto, and the extracted face candidate region and the non-face candidate region are respectively weighted by the weighting coefficients set in correspondence with the extracting method of extracting unit. Incidentally, (A) to (D) of FIG. 8 show a case where the number of extracting units to which the highest priority is imparted is "1."

In Step 184, a facial region is determined on the basis of the results of the weighting of the regions in the image. In this Step 184, if the number of extracting units which executed extraction processing previously is "1," the facial region is determined in accordance with the results of the weighting of the respective regions on the basis of the result of extraction by the aforementioned extracting unit. However, in a case where the extraction processing was effected by a plurality of extracting units previously, an overall weighting coefficient is determined for each portion of the image in correspondence with the results of extraction by the extracting units, and the image is divided into units of regions whose overall weighting coefficients are identical. Then, a region whose overall weighting coefficient is a predetermined value or more is determined to be a facial region.

In an ensuing Step 186, a determination is made as to whether or not there is an extracting unit to which has been imparted a priority lower than that of the the extracting unit which effected extraction processing earlier. If YES is the answer in the determination, a determination is made of an extracting unit to which a priority second highest to the extracting unit which effected processing earlier has been imparted. Then, only the image data on the facial region determined earlier in Step 184 (data on measuring points which are present in the range of the facial region) is outputted to all the relevant extracting units, and the execution of extraction processing is instructed thereto. Thus, in the extracting units which are instructed to execute extraction processing, extraction processing is effected only with respect to the range of the facial region determined on the basis of the the result of extraction by an extracting method of a high priority (the range indicated by hatching in (B) of FIG. 8, for example) as an object of processing. Thus, as compared with a case where extraction processing is effected with respect to the overall plane of the image as an object of processing, the extraction processing is completed in a short time.

In this case, an extracting method of a lower priority is used to assist an extracting method of a higher priority, and as shown in (C) of FIG. 8 by way of example, range narrower than the facial region determined earlier is extracted as a facial region.

After effecting the processing of Step 188, the operation returns to Step 174, and the processing of Steps 174 to 186 is effected in the same way as before. Then, if YES is given again as the answer in the determination in Step 186, the execution of extraction processing with respect to a further narrowed-down range as the range subject to processing is instructed to the extracting unit of an even lower priority. As the above-described processing is repeated, and if NO is the answer in the determination in Step 186, a facial region such as the one shown in FIG. 8D by way of example is extracted, and the facial-region determination processing ends. Then, the operation proceeds to Step 110 in the flowchart shown in FIG. 6A.

As described above, since the priorities with respect to the respective extracting methods are set such that the priority of an extracting method having a high facial-region extracting performance, it is possible to appropriately determine an actual facial region with a high probability by an extracting method of a high priority. At the same time, even in cases where it has not been possible to appropriately determine an actual facial region by an extracting method of a high priority, there is a high probability of being able to appropriately determine an actual facial region on the basis of the result of extraction by another extracting method of a lower priority, so that an actual facial region can be determined appropriately with a high probability.

Meanwhile, if it is determined in Step 148 that a data storage timing has arrived, and YES is hence given as the answer in the determination, the operation proceeds to Step 150. In Steps 150 to 162, the same processing as the facial-region determination processing (see FIG. 4) described in the first embodiment is carried out. In this case, extraction processing is effected by all the extracting units with respect to the overall plane of the image as an object for processing, and information representing the face candidate regions extracted by the extracting units is stored in the storage means 40E. At the same time, a facial region is determined on the basis of the results of weighting through the extraction processing by by the extracting units, and information representing the determined facial region is stored in the storage means 40E.

Figure 6A:
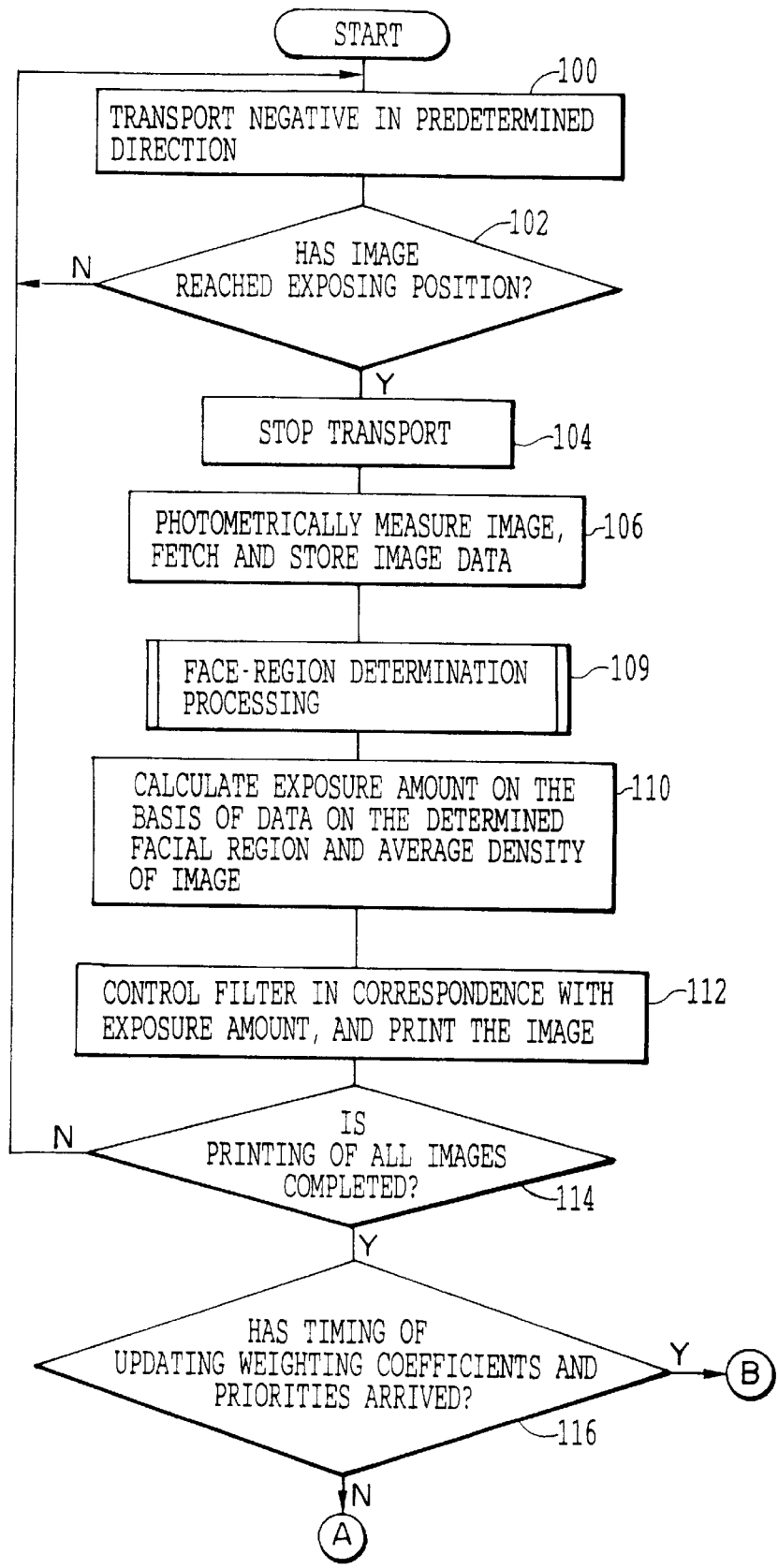
FIG. 6A is a flowchart illustrating photographic printing processing in accordance with a second embodiment.
Figure 7B:
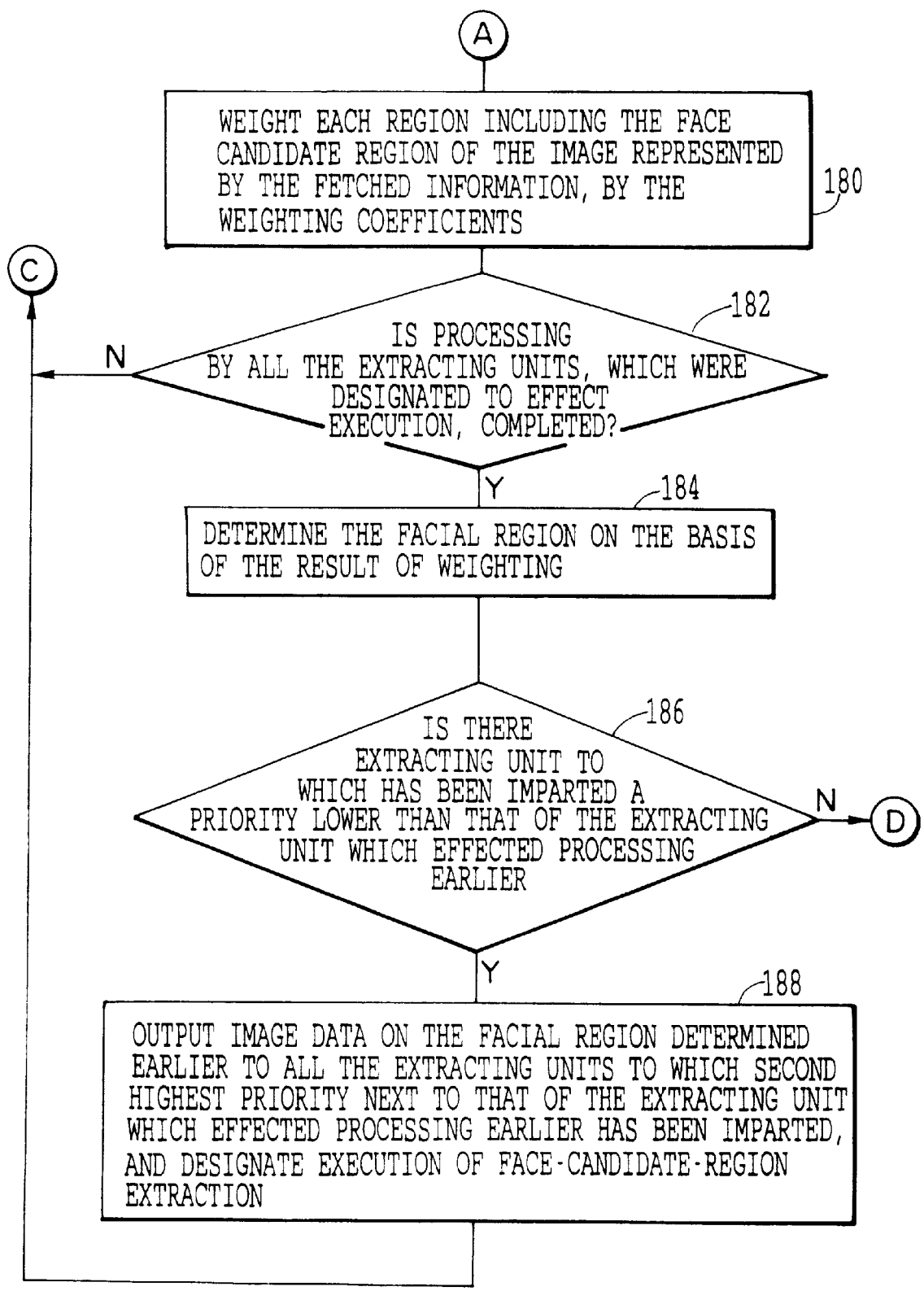
FIG. 7B is a flowchart illustrating the facial-region determination processing in accordance with the second embodiment.

In FIGS. 6A and 6B, processing in Step 110 and thereafter is almost the same as the printing processing shown in FIGS. 3A and 3B. In Step 116, however, a determination is made as to whether or not a timing for updating the weighting coefficients and priorities (the second predetermined timing in the above-described fourth aspect of the invention) has arrived. Then, if YES is the answer in the determination, since the processing of Steps 150 to 162 is periodically executed in the facial-region determination processing described above, the updating of the weighting coefficients is carried out in Steps 118 to 126 on the basis of the information stored in the storage means 40E in the same way as in the first embodiment.

In an ensuing Step 127, the priorities are updated in accordance with the results of evaluation of the facial-region extracting performance of the respective extracting methods in Step 124. Regarding these priorities as well, in the same way as the weighting coefficients, a high priority is imparted to an extracting method whose facial-region extracting performance has been evaluated to be high, and a low priority is imparted to an extracting method whose facial-region extracting performance has been evaluated to be low. Then, in an ensuing Step 128, the weighting coefficients and the priorities updated in Step 126 are stored in the storage means 40E, and the information which was stored in the storage means 40E to evaluate the facial-region extracting performance of each extracting method is deleted, and the processing ends.

In the above description, since the facial-region extracting performance of each extracting method is periodically evaluated, and the weighting coefficients and priorities are updated on each such occasion, even if the ratio of images having various image contents in the images which are processed by the photographic printing apparatus 10 changes, or the aforementioned ratio is different from those in other countries or districts, the weighting coefficients are updated in such a manner as to increase the weight of an extracting method which is able to extract regions of high degrees of coincidence with an actual facial region with a high probability with respect to a large number of images as face candidate regions. At the same time, the priorities are updated in such a manner that a high priority is imparted to that extracting method. Hence, in the facial-region determination processing in Step 109 of FIG. 6A, a region corresponding to the face of a human figure in each image is extracted with a high probability irrespective of the ratio of images having various image contents. At the same time, as compared with the facial-region determination processing in the first embodiment, it is possible to determine a facial region in a shorter period of time. In addition, since the exposure amount is calculated by placing emphasis on the color or density of the determined facial region, it is possible to obtain an exposure amount with which the portion corresponding to the face of the human figure in the image can be printed appropriately.

It should be noted that although the weighting coefficients and the priorities are used jointly, an arrangement may be provided such that only the priorities are used, and the respective extracting methods are consecutively executed in accordance with the priorities.

In addition, in the first and second embodiments, the weighting coefficients and priorities are periodically updated; however, the present invention is not limited to the same, and an arrangement may be provided such that optimum values of the weighting coefficients and priorities are determined by experiments and the like, and are stored in the photographic printing apparatus 10, and may be fixedly used without being updated.

Third Embodiment

Next, a description will be given of a third embodiment of the present invention. It should be noted that since this third embodiment has a configuration similar to those of the first and second embodiments, the respective parts will be denoted by the same reference numerals, and a description of the configuration will be omitted. Hereafter, a description will be given of the operation of the third embodiment.

In this third embodiment, weighting coefficients and priorities are set with respect to the extracting methods executed by the extracting units $56_1$ to $56_n$ in the same way as in the second embodiment, and priorities of execution of the respective extracting methods are set in advance.

In addition, in this third embodiment, the exposure amount E is calculated in accordance with Formula (2) below which is similar to Formula (1) referred in the first embodiment. The correction amount E1 in Formula (2) is derived from Formula (3) below.

$$\log E = E0 + E1 \quad (2)$$

where,

E0: basic exposure amount (which corresponds to the terms on the right-hand side of Formula (1) with the correction amounts $K_1$ and $K_2$ excluded)

E1: exposure correction amount (which corresponds to the correction amounts $K_1$ and $K_2$ on the right-hand side of Formula (1))

$$E1 = A1 \cdot x1 + A2 \cdot x2 + \cdots + Am \cdot xm + b \quad (3)$$

where, x1 to xm: m kinds of characteristic amounts of the image determined from the image subject to processing A1 to Am, b: coefficients The coefficients A1 to Am and of in the formula for calculating the correction amount in Formula (3) above are experimentally determined in advance as follows: Namely, a predetermined characteristic amount of the image (e.g., a density of a portion corresponding to a background) for roughly classifying photographic scenes of images subject to printing into a plurality of kinds of photographic scenes is predetermined. Then, M groups of sample images (e.g., a group of images photographed against bright backgrounds, and a group of images photographed against dark backgrounds) for deriving the correction amount E1 are prepared for each kind of photographic scenes. As for the sample scenes for each kind of photographic scenes, the contents of the groups of sample images and the number of sample images for each kind of photographic scenes are determined such that their statistical nature is similar to the statistical nature of groups of images that are classified as corresponding photographic scenes among the images to be printed.

Next, an ideal exposure correction amount Z is experimentally determined with respect to each of the sample images prepared, and preset m kinds of image characteristic amounts are determined. As for the m kinds of image characteristic amounts, it is possible to use the characteristic amounts of the image of a facial region and other regions in the sample images, e.g., a region corresponding to a non-background portion (which may or may not include a facial region) and a region corresponding to a background portion. Specifically, it is possible to use, for instance, an average density, a maximum value, a minimum value, an intermediate value of the density, a density value in a peak of a density histogram, a density value when an accumulation frequency from a maximum or minimum value of the density is a predetermined value, a frequency in a specific density range in the density histogram, and other known characteristic amounts of the image.

Then, for each kind of photographic scenes (each group of sample images), the coefficients A1 to Am and of the correction-amount calculating formula are determined by multiple regression calculation by setting as an objective variable the ideal exposure correction amount Z of each sample image belonging to the same group of sample images, and by setting as prediction variables the m kinds of image characteristic amounts of each sample image. If the exposure correction amount E1 is determined by using the coefficients A1 to Am and b of the correction-amount calculating formula determined as described above, and by substituting the m kinds of image characteristic amounts of the image to be printed into the correction-amount calculating formula, it is possible to obtain an exposure correction amount E1 in which a residual with the ideal exposure correction amount Z becomes statistically minimal.

In this third embodiment, the coefficients A1 to Am and b determined for each kind of photographic scenes as described above are stored in advance in the storage means 40E.

Figure 9A:
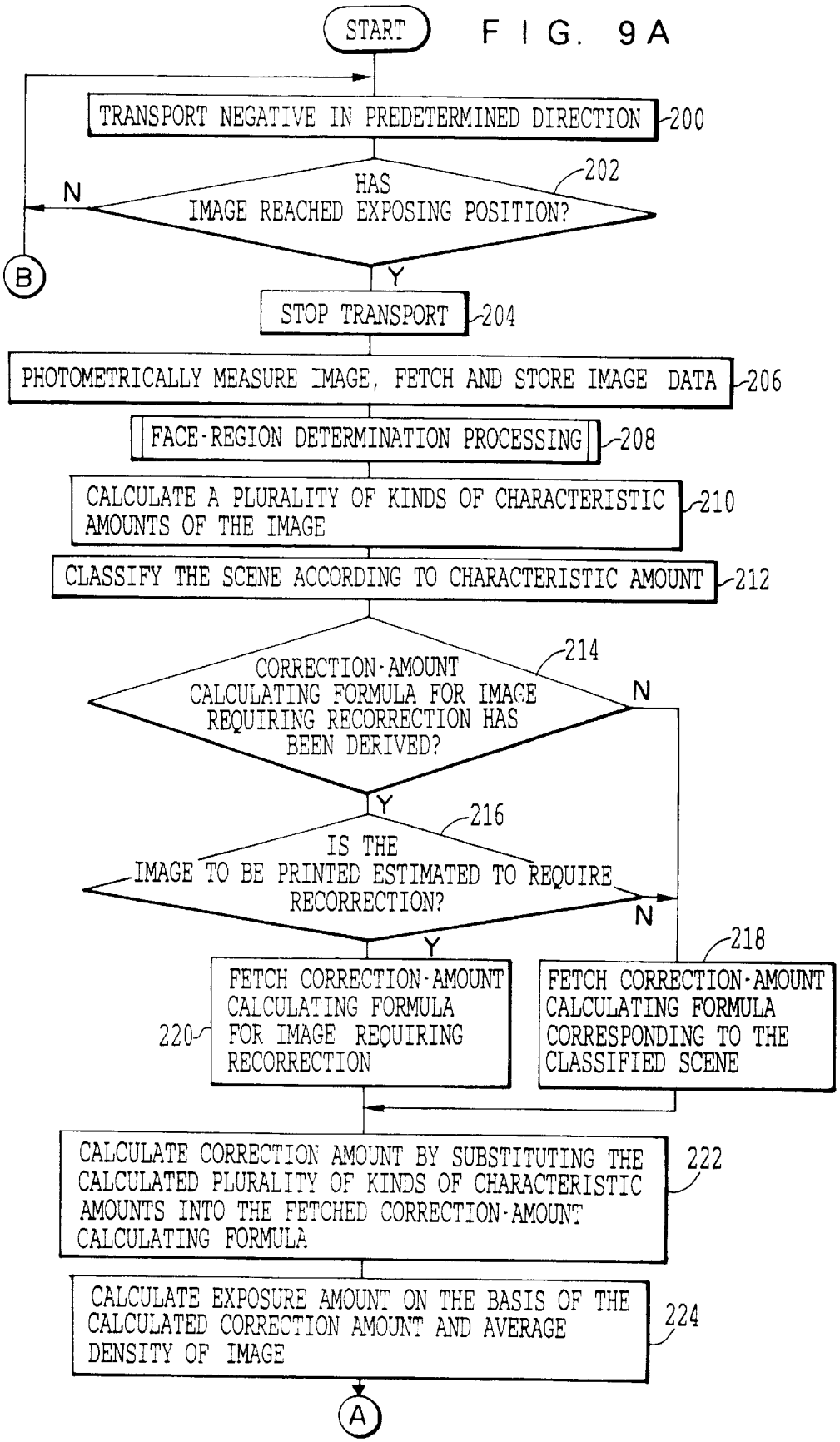
FIG. 9A is a flowchart illustrating photographic printing processing in accordance with a third embodiment.
Figure 9B:
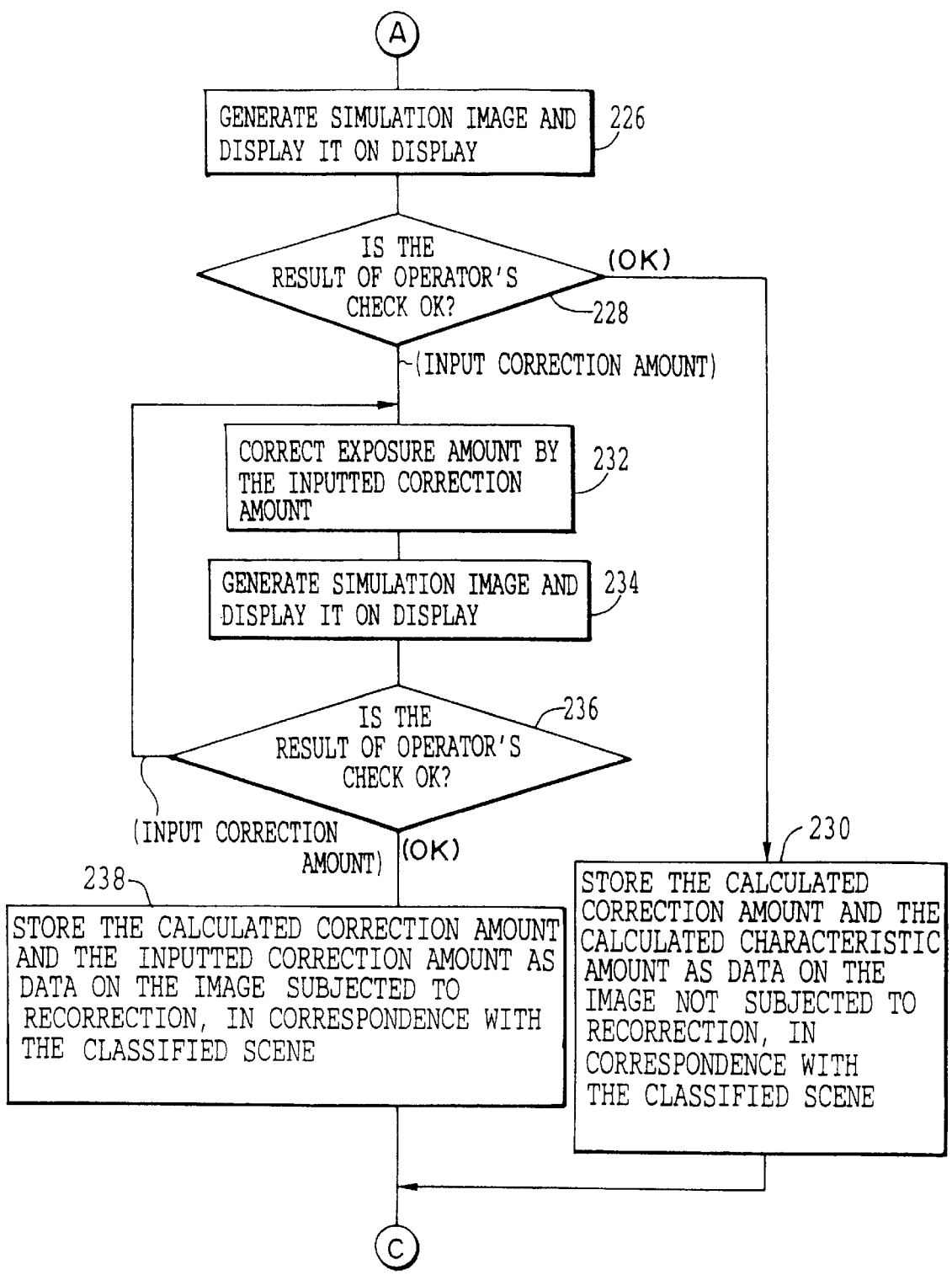
FIG. 9B is a flowchart illustrating photographic printing processing in accordance with the third embodiment.
Figure 9C:
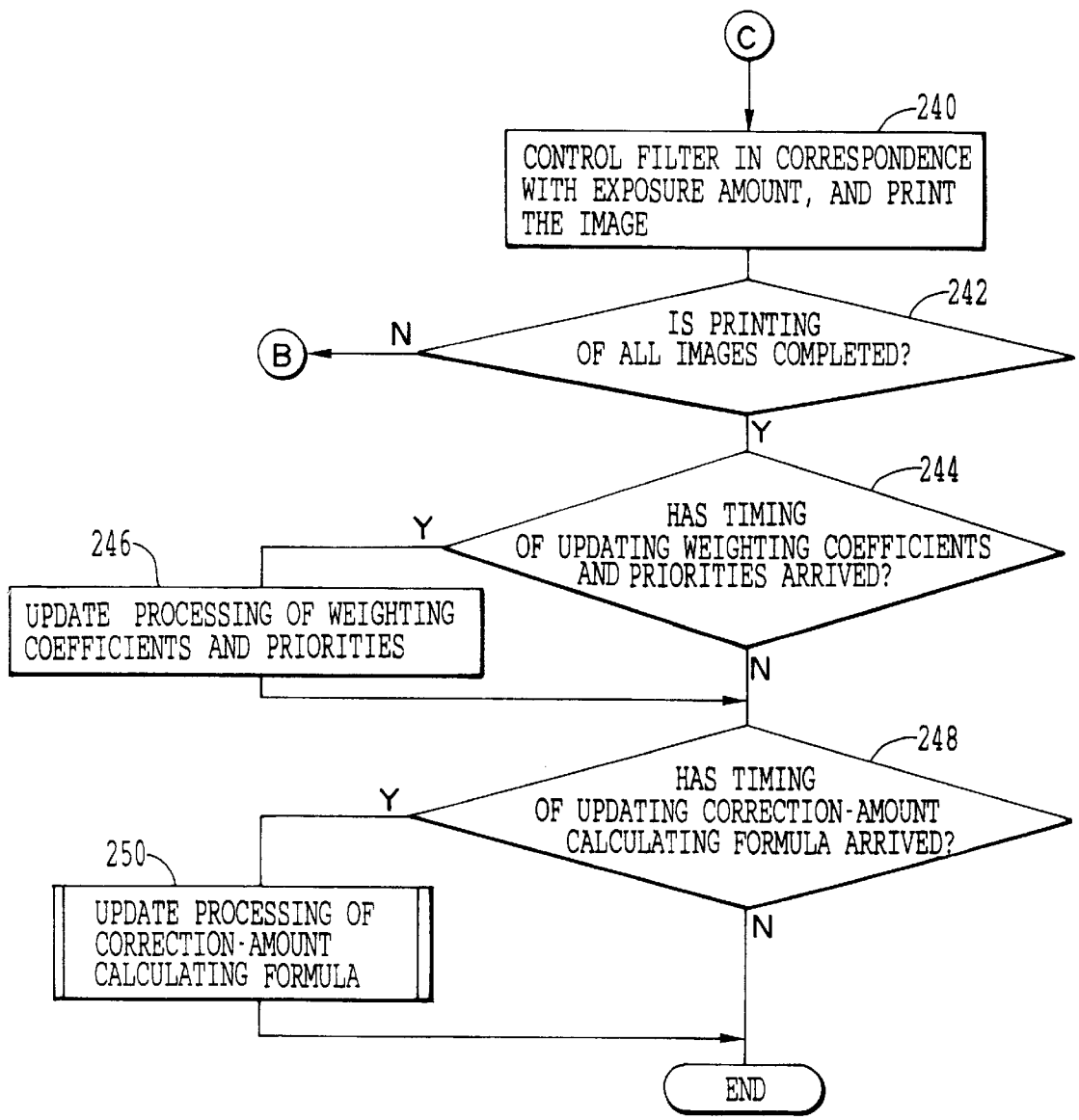
FIG. 9C is a flowchart illustrating photographic printing processing in accordance with the third embodiment.

Next, referring to flowcharts shown in FIGS. 9A, 9B, and 9C, a description will be given of printing processing in accordance with the third embodiment. In Steps 200 to 208, in the same way as Steps 100 to 109 of the flowchart of FIG. 6A referred to in the second embodiment, the negative film 12 is transported, the image recorded on the negative film 12 is positioned at the exposing position, the positioned image is photometrically measured by the CCD image sensor 32, and the image data obtained by photometry is stored in the RAM 40C or the like. Then, in Step 208, facial-region determination processing (see FIGS. 7A to 7C) is executed.

In an ensuing Step 210, the m kinds of image characteristic amounts of the image to be printed are calculated on the basis of the results of facial-region determination processing in Step 208. In Step 212, the photographic scene of the image to be printed is classified on the basis of a predetermined image characteristic amount (e.g., the density of a portion corresponding to the background), which as been set for roughly classifying the photographic scenes of images to be printed, among the plurality of image characteristic amounts calculated in the preceding step.

In Step 214, a determination is made as to whether or not a correction-amount calculating formula for images for which recorrection of the exposure amount is estimated to be required (the determined exposure amount is to be further corrected) has been derived. A description will be given later of the correction-amount calculating formula for images for which recorrection is estimated to be required. In the initial state (shipped state) of the photographic printing apparatus 10, the correction-amount calculating formula for images for which recorrection is estimated to be required has not been derived, so that, in that case, NO is given as the answer in the determination in Step 214, and the operation proceeds to Step 218. In Step 218, the coefficients A1 to Am and b of the correction-amount calculating formula corresponding to the photographic scene of the image to be printed, which has been classified earlier, are fetched, and the operation proceeds to Step 222.

In Step 222, the exposure correction amount E1 is calculated by substituting the m kinds of image characteristic amounts of the image to be printed, which was calculated earlier, into the correction-amount calculating formula determined by the coefficients A1 to Am and b fetched earlier. As a result, it is possible to obtain the exposure correction amount E1 which takes into consideration the image correction amounts of a region other than the facial region determined by the facial-region determination processing.

At the same time, since the correction-amount calculating formula (its coefficients) is determined for each kind of photographic scenes, it is possible to obtain an exposure correction amount E1 which allows the exposure amount to be corrected with high accuracy for each kind of photographic scenes.

In Step 224, the exposure amount E of the image to be printed is calculated by calculating the basic exposure amount E0 on the basis of the average density D and the like of the image to be printed, and by substituting the calculated basic exposure amount E0 and the exposure correction amount E1 calculated in the preceding step into Formula (2), i.e., the exposure-amount calculating formula. In Step 226, a printed image which is obtained by printing the image onto the printing paper 28 with the exposure amount E calculated in the preceding step and by effecting development and other processing is estimated. Then, a simulation image representing the estimated printed image is generated and is displayed on the display 42.

Here, the operator refers to the simulation image displayed on the display 42, and checks the image and determines whether or not the density, color, and the like of each portion of the simulation image are appropriate. Then, if the operator determines that the simulation image is appropriate, the operator enters through the keyboard 44 or the like information representing that the simulation image is "acceptable" as the result of the check. As described above, in this third embodiment, the images are classified according to the photographic scenes, and the exposure correction amount E1 is calculated by using coefficients for the correction-amount calculating formula determined in advance for each photographic scene in order to calculate the exposure amount E, so that the simulation images turn out to be "acceptable" with a high probability as the result of the check.

In an ensuing Step 228, a determination is made of the result of the operator's check of the simulation image. If information representing "acceptable" is entered, the operation proceeds from Step 228 to Step 230. In Step 230, the exposure correction amount E1 calculated in Step 222 and the m kinds of image characteristic amounts calculated in Step 210 are stored in the storage means 40E as data on an image not subjected to recorrection (an image for which the determined exposure amount was not corrected by the operator), in correspondence with the photographic scene classified in Step 212.

Meanwhile, in a case where a determination is made by the operator that the simulation image displayed on the display 42 is not appropriate, the operator enters through the keyboard 44 or the like information representing a correction amount for further correcting the exposure amount which was calculated earlier in Step 224 and is presently set for obtaining an appropriate printed image. As a result, the operation proceeds from Step 228 to Step 232, in which the presently set exposure amount E is further corrected by the inputted correction amount. In an ensuing Step 234, a simulation image is generated on the basis of the corrected exposure amount E in the same way as in the previous Step 226, and is displayed on the display 42. Then, in Step 236, a determination is made of the result of the operator's check of the redisplayed simulation image.

If the correction amount is entered again by the operator, the operation returns to Step 232 to repeat Steps 232 to 236. Meanwhile, if the information representing "acceptable" is entered by the operator, the operation proceeds to Step 238. In Step 238, the exposure correction amount E1 in which the correction amount entered by the operator is added to the exposure correction amount E1 calculated in Step 222, as well as the m kinds of image characteristic amounts calculated in Step 210, are stored in the storage means 40E as the data on an image subjected to recorrection, in correspondence with the photographic scene classified in Step 212.

In an ensuing Step 240, the exposure amount E (in a case where the correction amount has been entered by the operator, the exposure amount E to which the entered correction amount is added) is outputted to the driver 46, and the black shutter 26 is opened for a time duration which is determined by the exposure amount E. As a result, the image positioned at the exposing position is printed onto the printing paper 28 with the exposure amount E. In Step 242, a determination is made as to whether or not the printing of all the images recorded on the negative film 12 has been carried out. If NO is the answer in the determination, the operation returns to Step 200 to repeat the foregoing processing. If YES is the answer in Step 242, the operation proceeds to Step 244.

In Step 244, a determination is made as to whether or not a timing for updating the weighting coefficients and priorities has arrived. If NO is the answer in the determination, the operation proceeds to Step 248, but if YES is the answer in the determination, the operation proceeds to Step 246, where after effecting the updating processing of the weighting coefficients and priorities in the same way as in Steps 118 to 128 in the flowchart of in FIG. 6B, the operation proceeds to Step 248.

Figure 10A:
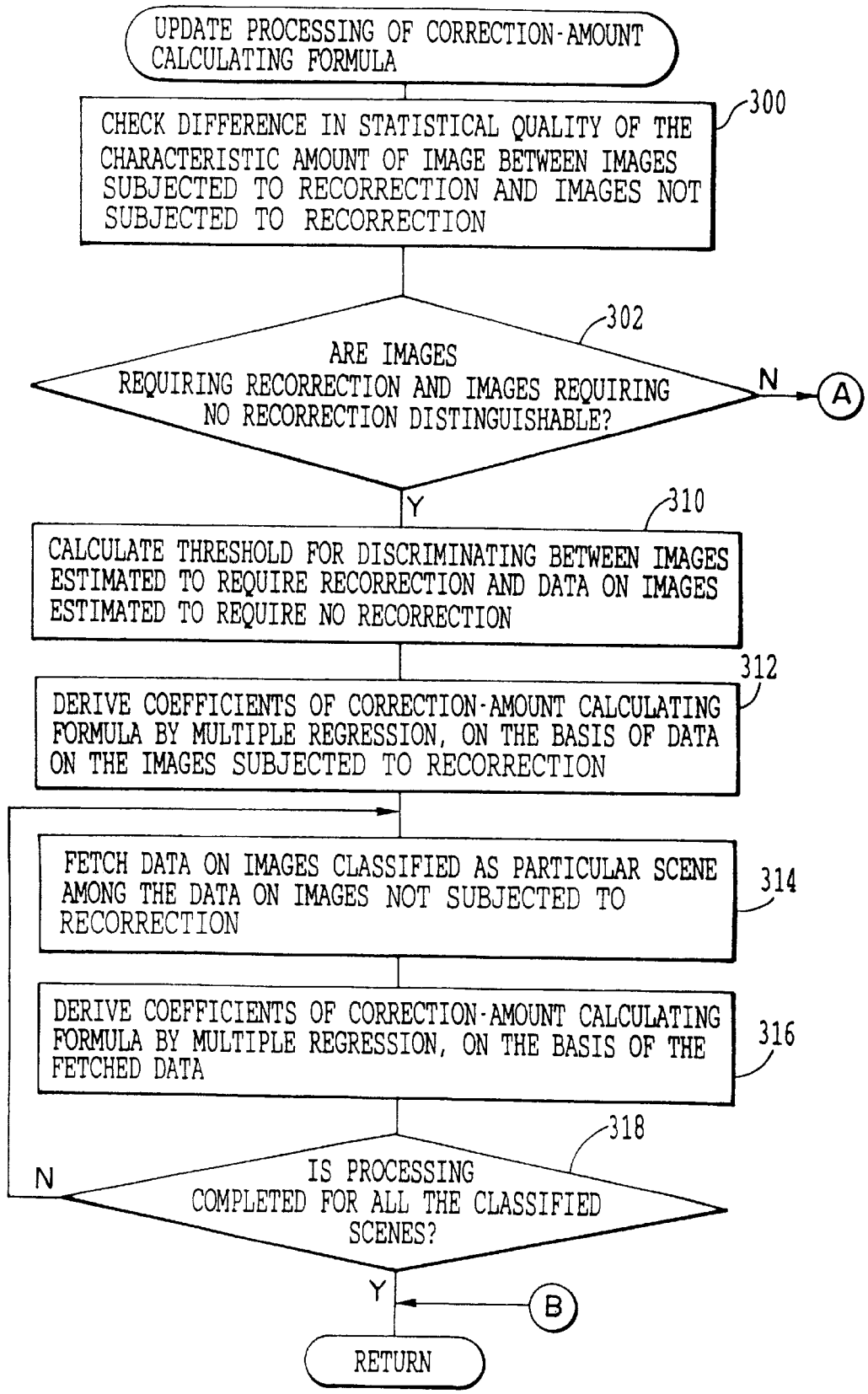
FIG. 10A is a flowchart illustrating processing for updating a correction-amount calculating formula in accordance with the third embodiment.
Figure 10B:
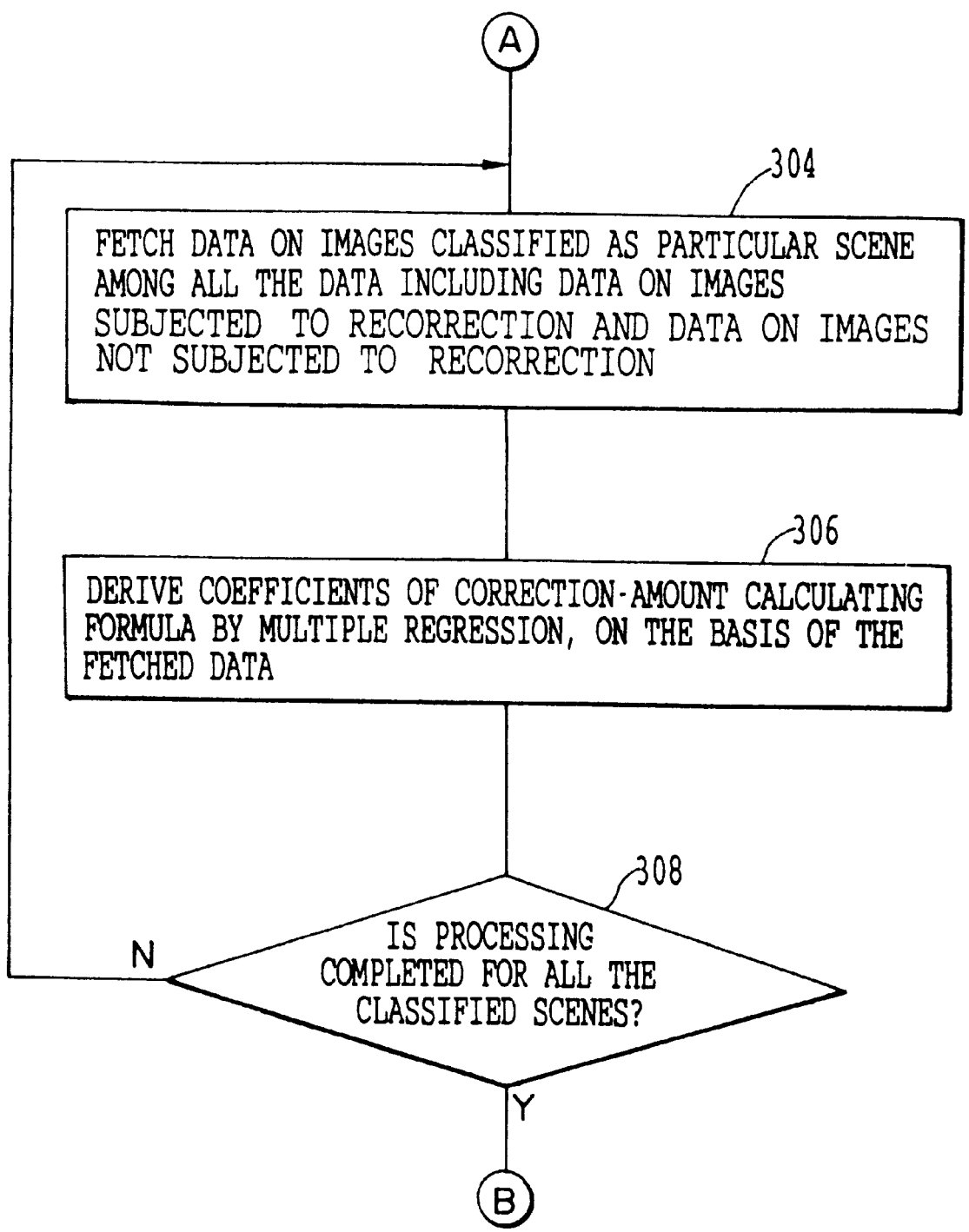
FIG. 10B is a flowchart illustrating processing for updating a correction-amount calculating formula in accordance with the third embodiment.

In Step 248, a determination is made as to whether or not a timing for updating the correction-amount calculating formula (the predetermined timing in the above-described eighth and ninth aspects of the invention) has arrived. YES is given as the answer in this determination each time a predetermined period of time has elapsed or a fixed volume of data has been stored in the storage means 40E. If NO is the answer in the determination, printing processing ends, but if YES is the answer in the determination, processing for updating the correction-amount calculating formula is executed in Step 250. Referring to the flowcharts shown in Figs. 10A and 10B, a description will be given of the processing for updating the correction-amount calculating formula.

In Step 300, on the basis of the data stored in the storage means 40E, a check is made of the difference in the statistical quality of the characteristic amount of an image between images subjected to recorrection and images not subjected to recorrection. This check can be made, for instance, by determining an average u and a variance a with respect to the m kinds of image characteristic amounts, which have been obtained by calculation on a multiplicity of images and stored in the storage means 40E, and which are classified into a group of images subjected to recorrection and a group of images not subjected to recorrection, and by determining whether or not there is an image characteristic amount which satisfies the following Formulae (4) among the m kinds of image characteristic amounts:

In the case of $\mu 0 > \mu 1 : (\mu 1 + k1 \cdot \sigma 1) < (\mu 0 - k0 \cdot \sigma 0)$ In the case of $\mu 0 < \mu 1 : (\mu 1 - k1 \cdot \sigma 1) > (\mu 0 + k0 \cdot \sigma 0)$ (4)

where, $\mu 0$: average value of a predetermined image characteristic amount of images not subjected to recorrection $\sigma 0$: variance of a predetermined image characteristic amount of images not subjected to recorrection $\mu 1$: a average value of a predetermined image characteristic amount of images subjected to recorrection $\sigma 1$: variance of a predetermined image characteristic amount of images subjected to recorrection where k0 and k1 are constants, and can be set by an experiment or the like.

In an ensuing Step 302, on the basis of the result of processing in Step 300, a determination is made as to whether or not it is possible to distinguish between images for which the determined exposure amount is required to be further corrected and images for which the determined exposure amount is not required to be corrected, i.e., whether there has been an image characteristic amount concerning which a difference in the statistical quality has been produced between images subjected to recorrection and images not subjected to recorrection. This can be determined on the basis of whether or not there has been an image characteristic amount which satisfies Formulae (4) among the m kinds of image characteristic amounts.

If NO is the answer in the above determination, the operation proceeds to Step 304, in which all the data (m kinds of image characteristic amounts, exposure correction amount E1) on images classified as a particular photographic scene is fetched among all the image data including data on the images subjected to recorrection and data on the images not subjected to recorrection. In an ensuing Step 306, the coefficients A1 to Am and of the correction-amount calculating formula (3) for images which are classified as the particular photographic scene are derived by multiple regression calculation by setting the exposure correction amount E1 of the fetched data as an objective variable and the m kinds of image characteristic amounts as prediction variables. The derived coefficients A1 to Am and b are stored in the storage means 40E in correspondence with the aforementioned particular photographic scene.

In an ensuing Step 308, a determination is made as to whether or not the above-described processing has been been completed for all kinds of the predetermined photographic scenes. If NO is the answer in the determination, the operation returns to Step 304 to repeat the processing of Steps 304 and 306, in which the coefficients A1 to Am and b of the correction-amount calculating formula for the various kinds of predetermined photographic scenes are respectively derived, and are stored in the storage means 40E. Then, if the above-described processing has been carried out for all the predetermined photographic scenes, YES is given as the answer in the determination in Step 308, and the data used in the processing is deleted, whereupon the processing for updating the correction-amount calculating formula ends.

Meanwhile, if YES is the answer in the determination in the earlier Step 302, the operation proceeds to Step 310, in which a calculation is performed of a threshold th whereby images for which recorrection is to be required (images for which the determined exposure amount is estimated to be further corrected by the operator) and images for which recorrection is not to be required (images for which the determined exposure amount is estimated to be not further corrected by the operator) are distinguished on the basis of an image characteristic amount. This threshold th, for instance, can be determined with respect to an image characteristic amount which satisfies Formulae (4) above, in accordance with the following Formula (5) or (6):

In the case of $\mu 0 > \mu 1$ and $(\mu 1 + k1 \cdot \sigma 1) < (\mu 0 - k0 \cdot \sigma 0)$, $th = \mu 1 + k2 \cdot \sigma 1$ (5)

In the case of $\mu 0 < \mu 1$ and $(\mu 1 - k1 \cdot \sigma 1) < (\mu 0 + k0 \cdot \sigma 0)$, $th = \mu 1 - k2 \cdot \sigma 1$ (5)

In Step 312, only the data on images subjected to recorrection is fetched, and, on the basis of the fetched data, the coefficients Al to Am and of the correction-amount calculating formula for images for which recorrection is estimated to be required are derived by multiple regression calculation in the same way as in Step 306 above, and the derived coefficients A1 to Am and b are stored in the storage means 40E. In Step 314, of the data on images not subjected to recorrection, which is stored in the storage means 40E, all the data on images classified as a particular scene is fetched. In an ensuing Step 316, on the basis of the fetched data, the coefficients A1 to Am and b of the correction-amount calculating formula for images, for which recorrection is estimated to be not required and which are classified as the aforementioned particular photographic scene, are derived by multiple regression calculation in the same way as in Step 306 above, and the derived coefficients A1 to Am and b are stored in the storage means 40E in correspondence with the aforementioned particular photographic scene.

In an ensuing Step 318, a determination is made as to whether or not the above-described processing has been carried out for all the kinds of the predetermined photographic scenes. If NO is the answer in the determination, the operation returns to Step 314 to repeat the processing of Steps 314 to 316, in which the coefficients Al to Am and b of the correction-amount calculating formula for the various kinds of predetermined photographic scenes are respectively derived, and are stored in the storage means 40E. Then, if the above-described processing has been carried out for all the predetermined photographic scenes, YES is given as the answer in the determination in Step 318, and the data used in the processing is deleted, whereupon the processing for updating the correction-amount calculating formula ends.

When the coefficients Al to Am and b of the correction-amount calculating formula for images for which recorrection is required are derived in the above-described manner, YES is given as the answer in the determination in Step 214 in the printing processing (see FIGS. 9A, 9B, and 9C) which is executed when an image to be printed is printed onto the printing paper 28. Then, the operation proceeds to Step 216. In Step 216, the predetermined image characteristic amount (the image characteristic amount which satisfied Formula (4) in the above processing for updating the correction-amount calculating formula) of the image to be printed is compared with the threshold th, and a determination is made as to whether or not recorrection is required for the image to be printed (the determined exposure amount is further corrected by the operator).

If NO is the answer in the determination, the operation proceeds to Step 218, but if YES is the answer in the determination, the operation proceeds to Step 220 to fetch the coefficients A1 to Am and b of the correction-amount calculating formula for images for which recorrection is estimated to be required. Consequently, in Step 222, the exposure correction amount E1 is calculated by using the fetched coefficients A1 to Am and b of the correction-amount calculating formula for images for which recorrection is estimated to be required.

To what extent of density the flesh color is to be optimally finished varies depending on countries and districts since the makeup of the race differs. In addition, even in the same district, the ratio of images in the images to be printed changes depending on a season, just as, for example, the ratio of images in which human figures with suntanned faces have been photographed increases during the summer. In addition, not only in images in which human figures have been photographed but also in images in which landscapes have been photographed, an appropriate exposure amount varies depending on seasonal features (for example, differences in the expression of the sunlight between a tropical area and other areas, differences in the expression of the sunlight between the summer and the winter, and so on).

In contrast, in the above, since the coefficients of the correction-amount calculating formula are periodically updated by using the correction amount inputted by the operator, if the operator enters a correction amount for the exposure amount in correspondence with the a change in the appropriate exposure amount which depends on the district or seasonal features, that correction amount is reflected on the coefficients of the calculation of the correction amount. As a result, the exposure correction amount E1 which makes it possible to correct the exposure amount appropriately in correspondence with the district or seasonal features is determined. In addition, in the above-described third embodiment, since the correction-amount calculating formula (its coefficients) is determined for each kind of photographic scenes, it is possible to obtain the exposure correction amount E1 which allows the exposure amount to be corrected with high accuracy for each kind of photographic scenes. Accordingly, it is possible to obtain with a high probability an exposure amount which allows a region corresponding to a principal portion of the image to be printed appropriately.

In addition, in the above, a determination is made as to whether or not it is possible to discriminate between images for which the calculated exposure amount is estimated to be further corrected by the operator and images for which the calculated exposure amount is estimated to be not corrected. If a determination is made that they are distinguishable, the correction-amount calculating formula (its coefficients) for images for which recorrection is estimated to be required is determined by using only the data on the images for which the calculated exposure amount has been further corrected (recorrected) by the operator. Therefore, even in a case where the ratio of images which are recorrected by the operator is considerably low, it is possible to obtain the exposure correction amount El which is able to correct with high accuracy the exposure amount for images which are estimated to be recorrected. Thus, the probability of the calculated exposure amount being further corrected by the operator can be further reduced.

Incidentally, in the third embodiment, images for which recorrection is estimated to be required and images for which recorrection is estimated to be not required are distinguished on the basis of one kind of characteristic amount of the image. However, in a case where if a difference is noted in the statistical quality between the images subjected to recorrection and the images not subjected to recorrection with respect to a plurality of kinds of characteristic amounts of the image, an arrangement may be provided such that the threshold th is determined with respect to each of the plurality of kinds of characteristic amounts of the image, and the images for which recorrection is estimated to be required and images for which recorrection is estimated to be not required are distinguished on the basis of a combination of the plurality of kinds of characteristic amounts of the image.

In addition, in the third embodiment, only one correction-amount calculating formula (its coefficients) is determined for images for which recorrection is estimated to be required. However, the present invention is not limited to the same, and the correction-amount calculating formula may be determined for each kind of photographic scenes so as to be used for images for which recorrection is estimated to be required.

Further, in the third embodiment, the updating of the the correction-amount calculating formula for each kind of photographic scenes and the determination as to whether or not it is possible to distinguish between images for which recorrection is required and images for which recorrection is not required, are effected at the same timing. However, the present invention is not limited to the same, the two items of processing may be effected at different timings. For instance, the determination as to whether or not it is possible to distinguish between images for which recorrection is required and images for which recorrection is not required may be effected when the proportion of the data on images for which the determined exposure amount was further corrected has reached a predetermined value or more.

In addition, in the above, an arrangement is provided such that a region corresponding to a principal portion is extracted from an image recorded on the negative film 12 serving as a photographic film, and the exposure amount at a time when the image is printed onto the printing paper 28 serving as a copying material is determined. However, the present invention is not limited to the same. As the recording medium of the image, it is possible to use other photographic films, such as reversal films, and various other kinds of recording medium, such as paper. Additionally, it is possible to apply the present invention to the determination of a copying condition at a time when an image is copied onto paper or the like serving as a copying material by means of electrophotography or the like.

Further, in the above, a description has been given of the case where a region corresponding to the face of a human figure as the principal portion is extracted from an image recorded on a photographic film. However, the present invention is not limited to the same. For example, in the mass-production of component parts, products, and the like, a situation in which the produced component parts, products, and the like are being consecutively conveyed may be photographed, an image representing the transported situation may be extracted from a photographing signal at a predetermined signal, and a region corresponding to the component part, product, and the like as the principal portion may be determined from the extracted image. In this case, the region where the determined figure subject to extraction is present can be used for the purpose of, for instance, automatically inspecting the produced component parts, products, and the like.

What is claimed is:

1. A method of determining a principal portion of an image, comprising the steps of:

extracting, from an identical original image, regions estimated to correspond to a principal portion thereof, respectively, by means of a plurality of mutually different extracting methods for extracting from an original image a region estimated to correspond to a principal portion thereof, and evaluating said extracting methods by comparing with respect to a plurality of original images, on the one hand, the regions estimated to correspond to the principal portion and extracted respectively from the identical original image by said extracting methods and, on the other hand, a region corresponding to the principal portion of the identical original image, or a region having a high probability of being a region corresponding to the principal portion of the identical original image and determined on the basis of the regions estimated to correspond to the principal portion and extracted respectively by said extracting methods;

setting in advance a weight with respect to each of said extracting methods in correspondence with a result of evaluation;

extracting regions estimated to correspond to a principal portion, respectively, from an original image from which the principal portion is to be extracted, by said extracting methods;

weighting each of the extracted regions by the weight set for each of said extracting methods; and determining a region having a high probability of being a region corresponding to the principal portion of the original image, on the basis of a result of the weighting.

2. A method of determining a principal portion of an image according to claim 1, wherein when the region having the high probability of being the region corresponding to the principal portion of the original image has been determined, information related to the region extracted by each of said extracting methods and information related to the determined region are stored, and wherein, at a predetermine timing, each of said extracting methods is reevaluated on the basis of the stored information, and the weight for each of said extracting methods is corrected.

3. A method of determining a principal portion of an image according to claim 2, wherein said extracting method includes at least one of an extracting method for extracting a region of a particular color in the original image as the region estimated to correspond to the principal portion, an extracting method for extracting a region estimated to correspond to the principal portion by detecting a pattern of shape peculiar to the principal portion, and an extracting method for extracting a region estimated to correspond to the principal portion by eliminating a region estimated to correspond to a background.

4. A method of determining a copying condition, comprising the steps of:

determining a region having a high probability of being a region corresponding to a principal portion with respect to an original image to be copied onto a copying material, by the method of determining a principal portion of an image according to claim 2; and determining a copying condition for the original image such that the determined region having the high probability of being the region corresponding to the principal portion is copied appropriately.

5. A method of determining a principal portion of an image according to claim 1, wherein said extracting method includes at least one of an extracting method for extracting a region of a particular color in the original image as the region estimated to correspond to the principal portion, an extracting method for extracting a region estimated to correspond to the principal portion by detecting a pattern of shape peculiar to the principal portion, and an extracting method for extracting a region estimated to correspond to the principal portion by eliminating a region estimated to correspond to a background.

6. A method of determining a copying condition, comprising the steps of:

determining a region having a high probability of being a region corresponding to a principal portion with respect to an original image to be copied onto a copying material, by the method of determining a principal portion of an image according to claim 5; and determining a copying condition for the original image such that the determined region having the high probability of being the region corresponding to the principal portion is copied appropriately.

7. A method of determining a copying condition, comprising the steps of:

determining a region having a high probability of being a region corresponding to a principal portion with respect to an original image to be copied onto a copying material, by the method of determining a principal portion of an image according to claim 1; and determining a copying condition for the original image such that the determined region having the high probability of being the region corresponding to the principal portion is copied appropriately.

8. A method of determining a principal portion of an image, comprising the steps of:

extracting, from an identical original image, regions estimated to correspond to a principal portion thereof, respectively, by means of a plurality of mutually different extracting methods for extracting from an original image a region estimated to correspond to a principal portion thereof, and evaluating said extracting methods by comparing with respect to a plurality of original images, on the one hand, the regions estimated to correspond to the principal portion and extracted respectively from the identical original image by said extracting methods and, on the other hand, a region corresponding to the principal portion of the identical original image, or a region having a high probability of being a region corresponding to the principal portion of the identical original image and determined on the basis of the regions estimated to correspond to the principal portion and extracted respectively by said extracting methods;

setting in advance a priority with respect to each of said extracting methods in correspondence with a result of evaluation;

extracting a region estimated to correspond to a principal portion from an original image from which the principal portion is to be extracted, by an extracting method of a high priority;

determining a region having a high probability of being a region corresponding to the principal portion of the original image, on the basis of a result of the extraction by the extracting method of the high priority;

extracting further a region estimated to correspond to the principal portion from the determined region, by an extracting method of a low priority; and determining again a region having the high probability of being the region corresponding to the principal portion of the original image, on the basis of a result of the extraction by the extracting method of the low priority.

9. A method of determining a principal portion of an image according to claim 8, wherein, at a first predetermined timing, regions estimated to correspond to the principal portion are respectively extracted from the original image by said extracting methods, a region having the high probability of being the region corresponding to the principal portion of the original image is determined on the basis of a result the extraction, and information related to the regions extracted respectively by said extracting methods and information related to the determined region are stored, and wherein, at a second predetermined timing, each of said extracting methods is reevaluated on the basis of the stored information, and the priority for each of said extracting methods is corrected.

10. A method of determining a principal portion of an image according to claim 9, wherein said extracting method includes at least one of an extracting method for extracting a region of a particular color in the original image as the region estimated to correspond to the principal portion, an extracting method for extracting a region estimated to correspond to the principal portion by detecting a pattern of shape peculiar to the principal portion, and an extracting method for extracting a region estimated to correspond to the principal portion by eliminating a region estimated to correspond to a background.

11. A method of determining a copying condition, comprising the steps of:

determining a region having a high probability of being a region corresponding to a principal portion with respect to an original image to be copied onto a copying material, by the method of determining a principal portion of an image according to claim 9; and determining a copying condition for the original image such that the determined region having the high probability of being the region corresponding to the principal portion is copied appropriately.

12. A method of determining a principal portion of an image according to claim 8, wherein said extracting method includes at least one of an extracting method for extracting a region of a particular color in the original image as the region estimated to correspond to the principal portion, an extracting method for extracting a region estimated to correspond to the principal portion by detecting a pattern of shape peculiar to the principal portion, and an extracting method for extracting a region estimated to correspond to the principal portion by eliminating a region estimated to correspond to a background.

13. A method of determining a copying condition, comprising the steps of:

determining a region having a high probability of being a region corresponding to a principal portion with respect to an original image to be copied onto a copying material, by the method of determining a principal portion of an image according to claim 12; and determining a copying condition for the original image such that the determined region having the high probability of being the region corresponding to the principal portion is copied appropriately.

14. A method of determining a copying condition, comprising the steps of:

determining a region having a high probability of being a region corresponding to a principal portion with respect to an original image to be copied onto a copying material, by the method of determining a principal portion of an image according to claim 8; and determining a copying condition for the original image such that the determined region having the high probability of being the region corresponding to the principal portion is copied appropriately.

15. A method of determining a copying condition according to claim 4, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 5, 8, or 9, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and said relationship, and the copying condition of the original image is determined by using the correction amount, wherein information representing the determined plurality of kinds of characteristic amounts of an image of the original image and information representing a finally used correction amount for the copying condition are stored, and wherein said relationship is updated at a predetermined timing on the basis of the information representing the plurality of kinds of characteristic amounts of an image stored with respect to the plurality of original images and the information representing the correction amount for the copying condition.

16. A method of determining a copying condition according to claim 15, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to to which one of the groups the original image to be copied belongs, the correction amount for the copying condition is calculated by using said relationship corresponding to the determined group, and the information representing the plurality of kinds of characteristic amounts of an image of the original image and the information representing the finally used correction amount for the copying condition are stored separately for each of the groups, and wherein said relationship is updated for each of the groups at the predetermined timing.

17. A method of determining a copying condition according to claim 15, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that said images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of said original image, whereas in a case where it is determined that the determined copying condition is required to be further corrected, the correction amount for the copying condition is obtained by using said relationship obtained with respect to the original images for which the determined copying condition was corrected, so as to determine the copying condition.

18. A method of determining a copying condition according to claim 6, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 7, 8, or 9, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and said relationship, and the copying condition of the original image is determined by using the correction amount, wherein information representing the determined plurality of kinds of characteristic amounts of an image of the original image and information representing a finally used correction amount for the copying condition are stored, and wherein said relationship is updated at a predetermined timing on the basis of the information representing the plurality of kinds of characteristic amounts of an image stored with respect to the plurality of original images and the information representing the correction amount for the copying condition.

19. A method of determining a copying condition according to claim 18, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to to which one of the groups the original image to be copied belongs, the correction amount for the copying condition is calculated by using said relationship corresponding to the determined group, and the information representing the plurality of kinds of characteristic amounts of an image of the original image and the information representing the finally used correction amount for the copying condition are stored separately for each of the groups, and wherein said relationship is updated for each of the groups at the predetermined timing.

20. A method of determining a copying condition according to claim 18, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that said images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of said original image, whereas in a case where it is determined that the determined copying condition is required to be further corrected, the correction amount for the copying condition is obtained by using said relationship obtained with respect to the original images for which the determined copying condition was corrected, so as to determine the copying condition.

21. A method of determining a copying condition according to claim 7, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 2, 5, 8, or 9, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and said relationship, and the copying condition of the original image is determined by using the correction amount, wherein information representing the determined plurality of kinds of characteristic amounts of an image of the original image and information representing a finally used correction amount for the copying condition are stored, and wherein said relationship is updated at a predetermined timing on the basis of the information representing the plurality of kinds of characteristic amounts of an image stored with respect to the plurality of original images and the information representing the correction amount for the copying condition.

22. A method of determining a copying condition according to claim 21, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to which one of the groups the original image to be copied belongs, the correction amount for the copying condition is calculated by using said relationship corresponding to the determined group, and the information representing the plurality of kinds of characteristic amounts of an image of the original image and the information representing the finally used correction amount for the copying condition are stored separately for each of the groups, and wherein said relationship is updated for each of the groups at a predetermined timing.

23. A method of determining a copying condition according to claim 21, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that said images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of said original image, whereas in a case where it is determined that the determined copying condition is required to be further corrected, the correction amount for the copying condition is obtained by using said relationship obtained with respect to the original images for which the determined copying condition was corrected, so as to determine the copying condition.

24. A method of determining a copying condition according to claim 11, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 1, 2, or 5, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and said relationship, and the copying condition of the original image is determined by using the correction amount, wherein information representing the determined plurality of kinds of characteristic amounts of an image of the original image and information representing a finally used correction amount for the copying condition are stored, and wherein said relationship is updated at a predetermined timing on the basis of the information representing the plurality of kinds of characteristic amounts of an image stored with respect to the plurality of original images and the information representing the correction amount for the copying condition.

25. A method of determining a copying condition according to claim 24, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to to which one of the groups the original image to be copied belongs, the correction amount for the copying condition is calculated by using said relationship corresponding to the determined group, and the information representing the plurality of kinds of characteristic amounts of an image of the original image and the information representing the finally used correction amount for the copying condition are stored separately for each of the groups, and wherein said relationship is updated for each of the groups at the predetermined timing.

26. A method of determining a copying condition according to claim 24, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that said images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of said original image, whereas in a case where it is determined that the determined copying condition is required to be further corrected, the correction amount for the copying condition is obtained by using said relationship obtained with respect to the original images for which the determined copying condition was corrected, so as to determine the copying condition.

27. A method of determining a copying condition according to claim 13, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 1, 2, 5 or 9, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and said relationship, and the copying condition of the original image is determined by using the correction amount, wherein information representing the determined plurality of kinds of characteristic amounts of an image of the original image and information representing a finally used correction amount for the copying condition are stored, and wherein said relationship is updated at a predetermined timing on the basis of the information representing the plurality of kinds of characteristic amounts of an image stored with respect to the plurality of original images and the information representing the correction amount for the copying condition.

28. A method of determining a copying condition according to claim 27, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to to which one of the groups the original image to be copied belongs, the correction amount for the copying condition is calculated by using said relationship corresponding to the determined group, and the information representing the plurality of kinds of characteristic amounts of an image of the original image and the information representing the finally used correction amount for the copying condition are stored separately for each of the groups, and wherein said relationship is updated for each of the groups at the predetermined timing.

29. A method of determining a copying condition according to claim 27, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that said images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of said original image, whereas in a case where it is determined that the determined copying condition is required to be further corrected, the correction amount for the copying condition is obtained by using said relationship obtained with respect to the original images for which the determined copying condition was corrected, so as to determine the copying condition.

30. A method of determining a copying condition according to claim 14, wherein a plurality of kinds of characteristic amounts of an image, including a characteristic amount of an image in a region corresponding to a principal portion of an original image or in a region having a high probability of being a region corresponding to the principal portion, are obtained with respect to a plurality of original images, and, on the basis of the obtained plurality of kinds of characteristic amounts and a correction amount for the copying condition of each of the plurality of original images, a relationship between the plurality of kinds of characteristic amounts of an image and the correction amount is obtained in advance, wherein after the region having the high probability of being the region corresponding to the principal portion has been determined with respect to the original image to be copied onto the copying material, by the method of determining a principal portion according to any one of claims 1, 2, 5 or 9, the plurality of kinds of characteristic amounts of an image of the original image, including the characteristic amount of the determined region having the high probability of being the region corresponding to the principal portion, are obtained, wherein the correction amount is calculated on the basis of the determined plurality of kinds of characteristic amounts of an image and said relationship, and the copying condition of the original image is determined by using the correction amount, wherein information representing the determined plurality of kinds of characteristic amounts of an image of the original image and information representing a finally used correction amount for the copying condition are stored, and wherein said relationship is updated at a predetermined timing on the basis of the information representing the plurality of kinds of characteristic amounts of an image stored with respect to the plurality of original images and the information representing the correction amount for the copying condition.

31. A method of determining a copying condition according to claim 30, wherein the original images are classified into a plurality of groups on the basis of a predetermined characteristic amount of an image, and the relationship between the plurality of kinds of characteristic amounts of an image and the correction amount for the copying condition is obtained for each of the groups, wherein, on the basis of the predetermined characteristic amount of an image of the original image, a determination is made as to to which one of the groups the original image to be copied belongs, the correction amount for the copying condition is calculated by using said relationship corresponding to the determined group, and the information representing the plurality of kinds of characteristic amounts of an image of the original image and the information representing the finally used correction amount for the copying condition are stored separately for each of the groups, and wherein said relationship is updated for each of the groups at the predetermined timing.

32. A method of determining a copying condition according to claim 30, wherein the information representing the plurality of kinds of characteristic amounts of an image of the original images which determined the copying condition and the information representing the finally used correction amount for the copying condition are stored separately for a group for which the determined copying condition was further corrected and a group for which the determined copying condition was not corrected, wherein, on the basis of the stored information, a determination is made at a predetermined timing as to whether or not an original image for which the determined copying condition is required to be further corrected and an original image for which the determined copying condition is not required to be corrected can be distinguished in advance on the basis of at least one of the plurality of kinds of characteristic amounts of an image, wherein, in a case where it is determined that said images can be distinguished in advance, a relationship between the plurality of kinds of characteristic amounts of an image and the correction amount for the copying condition concerning the original images for which the determined copying condition was further corrected is obtained in advance on the basis of the stored information, and in the determination of the copying condition, whether or not the original image to be copied onto the copying material is the original image for which the determined copying condition is required to be further corrected is determined on the basis of at least one of the plurality of kinds of characteristic amounts of an image of said original image, whereas in a case where it is determined that the determined copying condition is required to be further corrected, the correction amount for the copying condition is obtained by using said relationship obtained with respect to the original images for which the determined copying condition was corrected, so as to determine the copying condition.

* * * * *